United States Patent [19]
Wagner et al.

[11] Patent Number: 4,462,105
[45] Date of Patent: Jul. 24, 1984

[54] TRANSCEIVER UNIT FOR A TELECOMMUNICATION SYSTEM

[75] Inventors: Theodore Wagner, W. Palm Beach, Fla.; Donald Gray, Midwest City, Okla.

[73] Assignee: Siemens Corporation, Iselin, N.J.

[21] Appl. No.: 342,784

[22] Filed: Jan. 26, 1982

Related U.S. Application Data

[63] Continuation of Ser. No. 249,377, Mar. 31, 1981, abandoned.

[51] Int. Cl.$^3$ .............................................. H04L 7/02
[52] U.S. Cl. ........................................ 375/8; 375/20; 179/2 DP
[58] Field of Search ............................ 375/17, 20, 8; 179/2 DP, 170 C, 170 D, 170 T; 370/31

[56] References Cited

U.S. PATENT DOCUMENTS 3,590,386  6/1971  Tisi et al. ................................ 375/20
3,708,751  1/1973  Starr et al. .............................. 375/17

Primary Examiner—Robert L. Griffin
Assistant Examiner—Albert W. Watkins
Attorney, Agent, or Firm—Karl F. Milde, Jr.; Andrew G. Rodau

[57] ABSTRACT

A transceiver for use with a digital telephone apparatus adapted to be connected for duplex communication to a telephone speech transmission line includes a receiving unit and a transmitting unit. The receiving unit processes an incoming serial ternary level signal stream composed of alternate mark inverted (AMI) encoded pulses and received from the transmission line. A compensation filter compensates distortions of the transmitted signals. A full wave rectifier circuit generates unipolar output signals. A pulse detection circuit derives rectangular pulses from the unipolar output signals. A phase-locked loop (PLL) circuit reconstructs a clock pulse train from the rectangular pulses. The transmitting unit receives an outgoing serial data stream from the telephone apparatus and internal clock pulses from that PLL circuit and includes means for converting the pulses of the outgoing data stream into AMI encoded signals.

11 Claims, 18 Drawing Figures

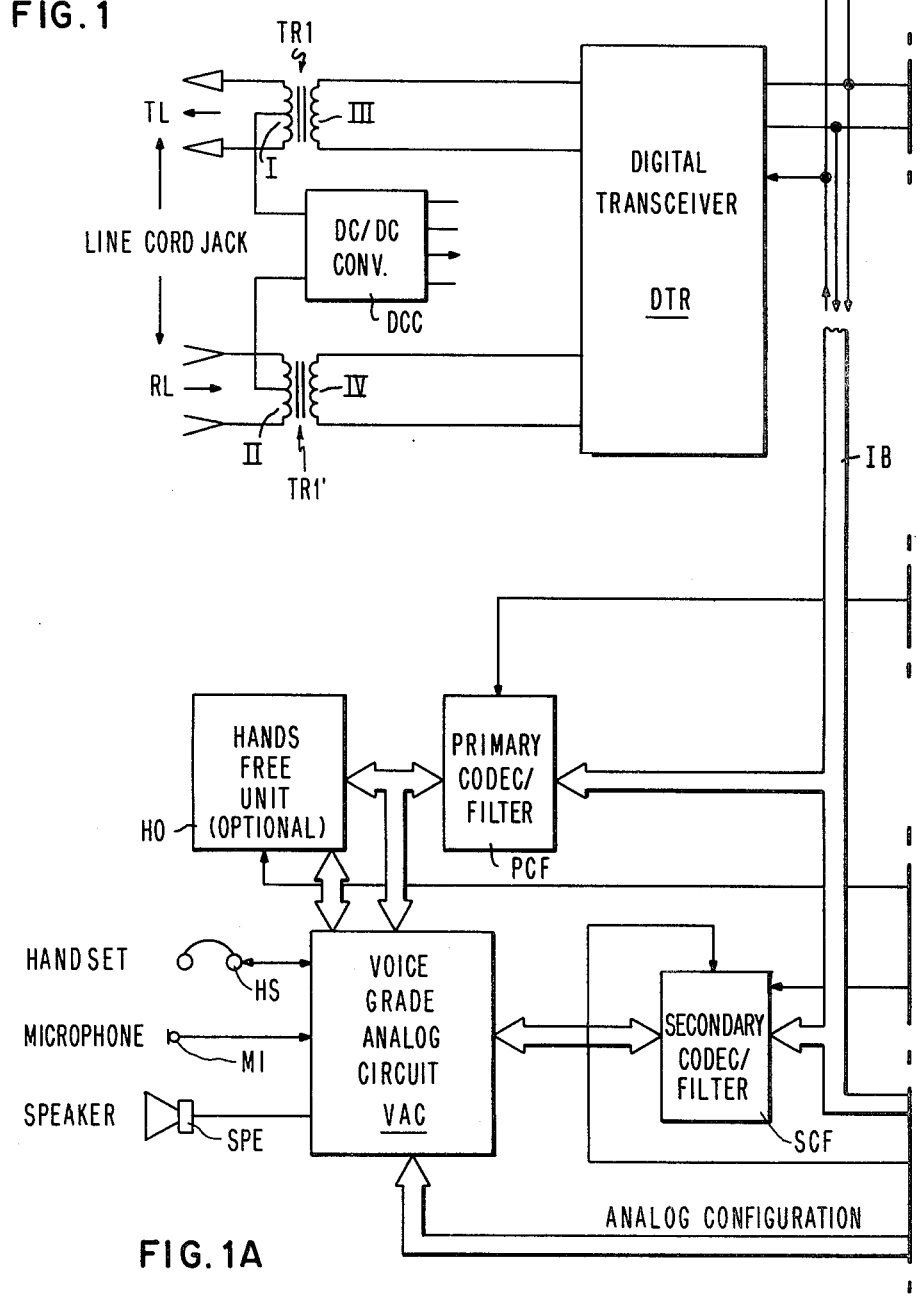

4,462,105

TRANSCEIVER UNIT FOR A TELECOMMUNICATION SYSTEM

CROSS REFERENCE TO RELATED APPLICATIONS

The present application is a continuation of abandoned U.S. patent application Ser. No. 249,377 filed Mar. 31, 1981. Furthermore, this application is related to the following commonly-owned U.S. patent applications:

(1) U.S. patent application Ser. No. 249,399, U.S. Pat. No. 4,370,648 of Theodore Wagner, Ramesh M. Vyas and Sam Liang for "Synchronizing Circuit for Use with a Telecommunication System";

(2) U.S. patent application Ser. No. 249,400, U.S. Pat. No. 4,389,544 of Theodore Wagner, Sam Liang and Deepak R. Muzumdar for "Digital Telephone Apparatus";

(3) U.S. patent application Ser. No. 249,395, U.S. Pat. No. 4,394,757 of Deepak R. Muzumdar, George Mierzwa, Richard Sanders and Orrie J. Vander Meiden for "Frame Format for PCM Speech Data In A Telephone Transmission System & Digital Telephone Apparatus for Use with this Frame Format"; and (4) U.S. patent application Ser. No. 249,390, U.S. Pat. No. 4,353,114 of Mustafa Y. M. Saleh for "DC/DC Converter".

BACKGROUND OF THE INVENTION

The invention is related to a digital telecommunication system. More specifically, it is related to a digital telephone apparatus suitable for subscriber stations and attendant consoles. Still more particularly, it is related to a transceiver forming an interface between the digital telephone apparatus and a telephone speech transmission line for duplex communication.

Such a transceiver receives a serial data stream from telephone apparatus and performs pulse shaping and converting operations on such a data stream prior to transmitting it onto the speech transmission line. In the opposite transmitting direction a serial data stream is received from the transmission line and is then processed to obtain a non-distorted pulse train bearing binary coded data in a code compatible to the requirements of the telephone apparatus.

The digital data are transmitted at a fixed data rate which is inherent for the telecommunication system and are arranged in frames such that binary coded information and control information of the communication system like a synchronization code and a signalling code can be definitely separated by allocating items of data to predetermined time slots.

Conventional transmitting procedures of digital data are known which do not require transmitting of a separate clock which has to be synchronized with the system clock but make use of possibilities for recovering the system clock pulses from the transmitted data. But digital telephone apparatus of the state of the art cannot receive and transmit digital data in different channels and in one frame format by means of a signal transmitting receiving device designed as an interfacing unit between the digital telephone apparatus and the transmission line for duplex communication.

A variety of encoding techniques for transmitting digital data is known; one of these techniques is the so-called "Alternate Mark Inverted" (AMI) encoding which has been used for digital trunk circuits in pulse code modulated (PCM) communication systems. A main characteristic of AMI encoding is that the required bandwidth of the transmitting medium is only one-half the bandwidth of the digital data to be sent. For example, in a PCM 30 system—wherein one pulse frame consists of 32 data bytes the conventional data rate is 2.048 MHz based upon the usual sampling rate of 8,000 samples. If AMI encoding is used, the necessary bandwidth is only 1.024 MHz. Thereby, longer cable distances between repeaters can be achieved and crosstalk between twisted cable pairs of the transmission line which escalates with increasing frequency can be minimized.

It is, therefore an object of the present invention to provide an integrated transmitting/receiving unit, which is called a transceiver of low outlay and high reliability which is designed especially for use with peripheral units of such systems, such as subscriber sets and attendant consoles.

Another object of the present invention is to provide such a transceiver which is suitable for use with digital telephone apparatus which may be connected to the control switch by transmission lines comprising different loop lengths in a range of up to 4,000 feet without the need of individual adjustments according to the varying loop length.

Still another object of the present invention is to provide such a transceiver which dissipates little watt power, which meets official standards and requirements, also for heat radiation, and which is designed in a space-saving manner.

Still another object of the present invention is to provide a transceiver which is designed for recovering system clock pulses from an incoming data stream. Thus clock pulses are obtainable for use as internal clock pulses in the transceiver for synchronizing the serial data received from and to be transmitted to the transmission line and for use as internal clock pulses within the telephone apparatus as well.

SUMMARY OF THE INVENTION

These objects, as well as other objects, which will become apparent from the discussion which follows, are achieved according to the present invention by: a transceiver for use with a digital telephone apparatus suitable for subscriber stations and attendant consoles and adapted to be connected for duplex communication to a telephone speech transmission line by means of transmitter and receiver coils of transformer. The transceiver which is controlled by an internally recovered clock pulse train incorporated a receiving unit connected to the receiving coil of the transformer for receiving a serial ternary level signal stream composed of alternate mark inverted encoded signals. The receiving unit includes a compensation filter for compensating distortions of the transmitted signals and a signal spectrum filter to minimize susceptability to out-of-band interferences. A full wave rectifier circuit is connected to the compensation filter for generating unipolar output pulses representing binary "1" values by positive high level pulses. A pulse detection circuit is connected to the rectifier circuit for determining the presence or absence of unipolar pulses. The pulse detection circuit employs an automatic threshold which adapts to varying line lengths by tracking the peak amplitude of the unipolar pulses.

A phase-lock loop circuit coupled to the pulse detection circuit is provided for reconstructing a clock pulse train from the rectangular pulses generated by the pulse detection circuit.

The phase lock loop utilizes a sampling phase detector to minimize tracking phase jitter and to improve acquisition reliability. The phase-lock loop circuit has an output supplying the recovered clock pulses.

There is also incorporated a D flip-flop having a data input connected to the pulse shaping circuit. A clock input of this flip-flop is connected to the output of the phase-lock loop circuit. The D flip-flop has an output forming a data output for a synchronized stream of incoming data composed of pulses representing a high level signal for binary values "1" and a low level signal for binary values "0".

Furthermore, the transceiver also includes a transmitting unit having a data input for receiving from the telephone apparatus an outgoing serial data stream identically encoded as the incoming data stream. A clock pulse input of the transmitting unit is connected to the output of the phase-lock loop circuit used for generating internal clock pulses. A data output of the transmitting unit is coupled to the transmission line by the transmitter coil of the transformer. This transmitting unit incorporates means for converting the pulses of the outgoing data stream into an output data stream wherein the signals are encoded according to alternate mark inverted encoding and spectrum filtered to minimize emitted interference on the telephone transmission line.

According to the present invention, the receiving unit and the transmitting unit are integrated parts of one device which is called a transceiver. The device requires only supply voltages of +5 V and −5 V having a deviation of preferably not more than 10%. The connected transformer provides a means for feeding or receiving direct current power of the transmission line and provides a longitudinal balance of high performance over the range of 20–200 KHz. This balance prevents the transmission line from acting like an antenna.

The frequency compensation filter of the receiving unit helps to remove amplitude and phase distortions caused by the characteristics of the transmission line. The precision fullwave rectifier circuit is used to convert the incoming bipolar AMI pulses into unipolar pulses. It provides high output symmetry facilitated by the use of wide band devices. The pulse detection circuit preferably is designed as a comparator circuit using a variable direct current threshold signal which is derived from the received data stream. At the output of the pulse shaping circuit there are generated output pulses of 50% duty cycle over a wide dynamic input range. As a result, in the receiving unit no individual measures for adjusting its circuits to varying loop lengths are necessary. Furthermore, the 50% duty cycle of the rectangular pulses generated at the output of the pulse shaping circuit maximizes a frequency component of the pulse spectrum which is identical to the clock frequency to be recovered and which is the center frequency of the phase-locked loop circuit. The phase-locked loop circuit preferably uses a sampling circuit to minimize phase drift during long strings of successive zero bits in the serial data stream received from the transmission line.

The transmitting unit which is controlled by the clock pulse train recorded by the receiving unit is designed with a minimum of hardware. The means for converting the pulses of the outgoing data stream preferably are implemented by just one JK flip-flop which is operating as a toggle flip-flop and an operational amplifier including input and feedback circuits of the design of a shaping filter. The result is a train of positive and negative pulses which are extremely symmetric and which approximate raised cosine pulses. The design of the converting means is preferably such that the pulses are one half the bit time wide at their 50% amplitude points which is useful for receiving these pulses at the opposite end of the transmission line over a wide dynamic range. In addition, it may be noted that the implementation of the transceiver according to the present invention may match requirements for four-wire operation and so-called two-wire "ping-pong" transmission, as well.

BRIEF DESCRIPTION OF THE DRAWINGS

FIGS. 1, 1A and 1B show a block diagram of a digital telephone apparatus according to the invention and suitable for subscriber stations and attendant consoles.

DETAILED DESCRIPTION OF A PREFERRED EMBODIMENT

The invention will now be described with reference to a preferred embodiment of a telephone apparatus suitable for subscriber stations and attendant consoles equipped either with or without one or more optional features such as a speakerphone ("hands free") unit, a digital unit interface, a subscriber message detailed recording printer and the like. This digital telephone apparatus is connected for duplex communications with a telephone transmission line that forms a part of a digital telephone system. Such a system may comprise a private branch exchange (PABX) or may constitute a public telephone system.

Figure 1B:
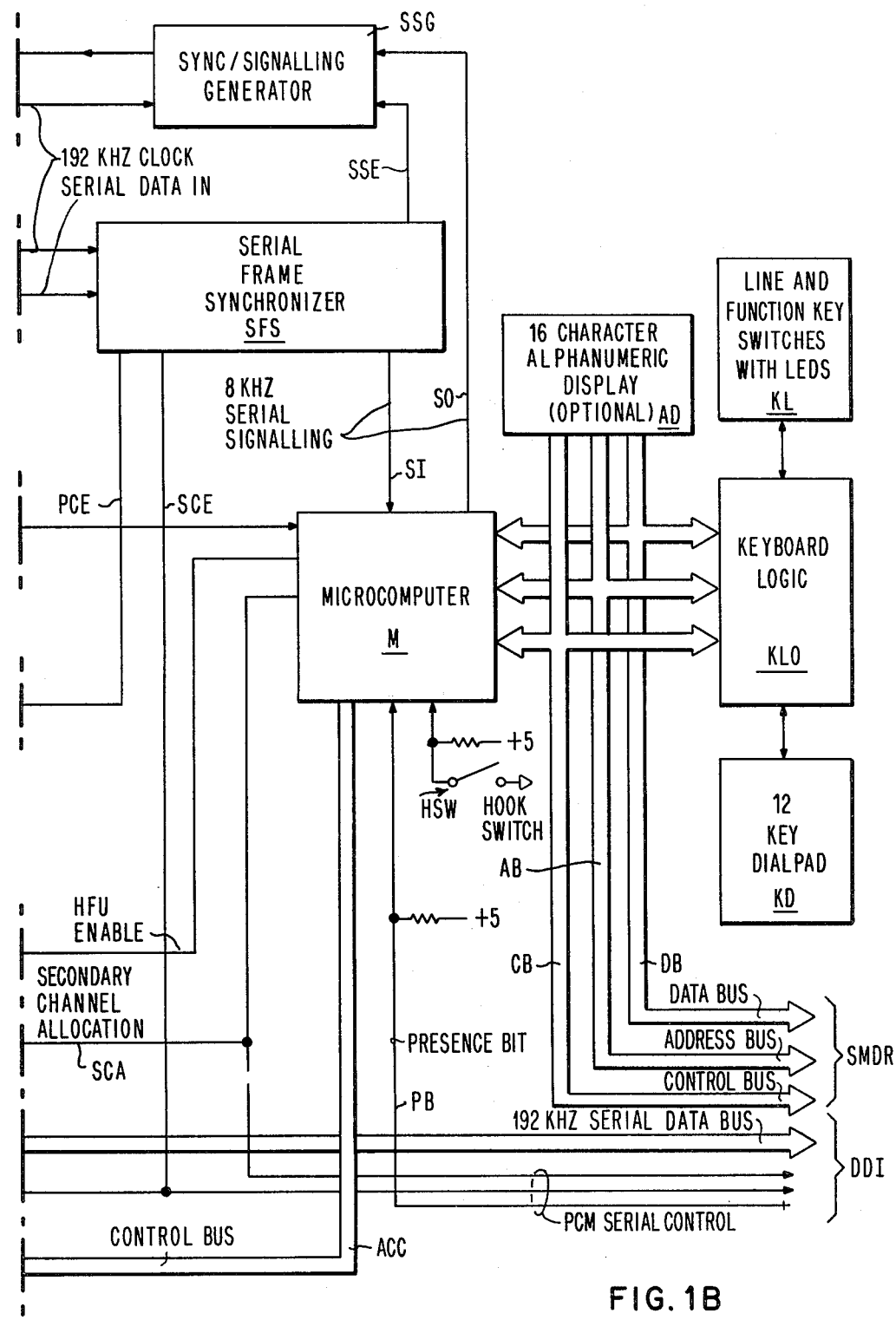

Apparatus Architecture (FIG. 1)

FIG. 1 shows a digital telephone apparatus suitable for subscriber stations and attendant consoles. This apparatus may be connected to peripheral, optional equipment (not shown) such as a digital data interface DDI or a subscriber message detailed recording printer SMDR. The digital telephone apparatus is connected for duplex communications with a telephone transmission line TL/RL. The transmission line TL/RL is connected with windings I and II of transformers TR1 and TR1'. These transformers provide a phantom pair of wires, which is connected with a DC/DC power supply converter DCC. This converter receives direct current from the transmission line and generates the different DC voltages needed for the apparatus.

Secondary windings III and IV of the transformers TR1, TR1' are connected with a digital transmitter/receiver or "transceiver" DTR. The two wire pair TL of the transmission line are the transmitting wires; the two wire pair RL of the transmission line are the receiving wires. The transceiver DTR simultaneously transmits on the line TL and receives from the line RL a plurality of different data words which are arranged in a prescribed three-word frame format, described herein below, and encoded with alternate mark inversion.

The transceiver DTR converts the alternate mark inversion encoded signal received from the transmission line RL into a 192 KHz clock as well as a serial data stream, herein called "serial data in". The transceiver also converts a data stream called "serial data out" from the telephone apparatus into an alternate mark inverted encoded signal for transmission on the line TL.

The 192 KHz clock signal is passed via an internal serial data bus IB to a sync/signal generator SSG, a serial frame synchronizer SFS, a primary codec/PCM filter PCF, a secondary codec/PCM filter SCF and at least one peripheral system, for example, the digital data interface DDI of a digital computer or the like. Serial data received from the transmission line RL is passed via the internal data bus IB to the serial frame synchronizer SFS, the primary codec/PCM filter PCF, the secondary codec/PCM filter SCF and the peripheral system DDI. The digital transceiver DTR receives a serial data stream, for transmission onto the transmission line TL, via the internal data bus IB from the sync-/signal generator SSG, the primary codec/PCM filter PCF, the secondary codec/PCM filter SCF and the peripheral system DDI.

The serial frame synchronizer SFS detects from the received serial data the synchronizing code and the signalling bit or bits, which are transmitted in one word of the frame format, so as to synchronize the different time slots of a frame format in time. The serial frame synchronizer generates three enabling signals in synchronism with the three eight-bit words or bytes of each frame format: sync/signalling enable SSE, primary channel enable PCE, and secondary channel enable SCE. The signal SSE is passed to the sync/signalling generator SSG which generates a word (byte) comprising a seven bit synchronization code and a single signalling bit received from the microcomputer M via the signalling output line 50. Upon receipt of the signal SSE, the sync/signalling generator passes this word out on the serial data out line of the internal but to the digital transceiver DTR.

The signal PCE is passed to the microcomputer M and to the primary codec/PCM filter PCF. The rising edge of the signal PCE informs the microcomputer to look for a signalling bit on the signalling input line SI. The signal PCE also enables the primary codec/PCM filter PCF to receive and transmit on the serial data in and serial data out lines, respectively.

The signal SCE enables the secondary codec/PCM filter SCF and/or the digital data interface DDI for transmission of serial data to and from these units. Selection of one of these units is made by the microcomputer M via a secondary channel allocation signal SCA. The digital data interface requests access to the secondary channel via a presence bit PB.

Both the microphone and the receiver of the handset as well as the microphone and the loudspeaker of the speakerphone of "hands free unit" are connectable by means of microcomputer—controlled switches with either one (but only one) of the two codec/PCM filters PCF and SCF. These switches belong to the voice grade analog circuit VAC which is controlled by the microcomputer M via an analog configuration control bus ACC. Normally there is no hands free feature in the telephone apparatus because the optional hands free circuit board HO is needed. If added, this hands free circuit board HO is enabled by a signal "HFU enable" from the microcomputer and will only be used in connection with one of the two codec/PCM filters. The hands free circuit selects for transmission the voice of the loudest speaker. It may be a conventional unit and will not be described herein because it forms no part of the present invention.

If one of the codec/PCM filters is connected with the telephone handset for transmitting and receiving of one word of the frame format, thus transmitting and receiving on one channel, a peripheral system, for example the digital data interface DDI, may be enabled to transmit on the other channel. As will be pointed out below, the three-word, two-channel frame format permits the multiplexing of both voice and data, or voice and voice.

In addition to these connections the telephone apparatus may hold a connection with an external subscriber via one codec/PCM filter and, in response to a signal from the subscriber, can make a call back connection via the second codec/PCM filter; that is, via a separate data word or channel of the frame format. In this case the first connection will be disconnected by the voice grade analog circuit VAC and the second connection will be established via the second codec/PCM filter and the voice grade analog circuit.

Thus the two channel frame format permits the telephone apparatus to support two different telecommunication connections simultaneously. For example, one connection may be made with another telephone subscriber for a voice communications while another connection is made with a data system for the transmission of digital data. Alternatively, the telephone apparatus may support a first subscriber to subscriber connection for normal voice communication plus a second subscriber to subscriber connection in a call back function.

As noted above, the microcomputer M controls the switching of the voice grade analog circuit VAC and the hands free circuit HO via the analog configuration control bus ACC and the control line "HFU enable", respectively. Furthermore, the microcomputer M controls the use of the second channel in the PCM frame via the secondary channel allocation line SCA. In this way, a peripheral data system connected to the digital data interface DDI may transmit and receive data via the telephone transmission line TL/RL.

However, the microcomputer has other functions as well. All the data which are transmitted and received over the internal data but IB are fast data signals: In this embodiment, one word or byte per channel is transmitted every 125 microseconds. As will be explained below, the frame format also supports the transmission of slower data which are needed to perform such functions as setting characters in a numeric display, illuminating LEDs, transmitting operational commands and the like. This slower data is transmitted at a rate of 1 bit per 125 microsecond frame or 8 KHz. This bit, the so-called "signalling" bit, is serially received by the microcomputer M and successive bits are assembled into bytes. For reasons which will be explained below, one byte is assembled every 4 milliseconds for a byte rate of 250 Hz.

Simultaneously with the receipt of signalling bits the microcomputer M transmits signalling bits at the same 8 KHz rate on the output line SO. This enables the microcomputer to conduct a signalling dialog with a private branch exchange (PABX) or some other switch at the end of the telephone transmission line TL/RL.

In addition to the signalling input and output on lines SI and SO, respectively, the microcomputer is coupled to I/O devices such as an alphanumeric display AD, a special message detailed recording printer SMDR and two keyboards KL and KD. The keyboards KL and KD are interfaced to the microcomputer via a keyboard logic KLO. The display, keyboards and printer are connected to the microcomputer via a common data bus DB, address bus AB and control bus CB. These I/O devices are thus addressed and controlled by the microcomputer M and transmit or receive data to and from the microcomputer in the conventional manner. Additional I/O devices may also be connected to the microcomputer via the data, address and control busses.

The alphanumeric display AD may be a 16 character liquid crystal display for informing the operator of the telephone apparatus of telephone numbers, names and other messages. The keyboard KL may comprise line keys for selecting and indicating one of a number of telephone lines to which the telephone apparatus is connected and function keys for selecting and indicating functions such as "HOLD", and "I-USE". The I-USE function is described in the commonly owned U.S. patent application Ser. No. 196,685 filed Oct. 14, 1980 by John Holesha entitled "I-USE Indication in a Telephone Keyset".

The key dialpad KD may or may not be provided with LEDs on each key and is intended for use in dialing telephone numbers. It may also be used to imput numerical information to the microcomputer if the latter is programmed for use as a calculator, for example.

In addition to the I/O devices referred to above, the microcomputer M is also connected to the telephone hook switch HSW and is thus informed whether the telephone apparatus is in the "on-hook" or "off-hook" condition.

The microcomputer M may be any commercially available single chip computer which is sufficiently fast and has sufficient ROM and RAM capacity to accomplish the necessary tasks. A suitable microcomputer for this purpose is the Intel 8049.

The software or firmware for the microcomputer M will depend upon the functions the microcomputer is intended to execute. Typical commands for the microcomputer which may be received from a private branch exchange (PABX) via signalling bits on the line SI and assembled into 8-bit signalling bytes are:
1. Ring (or beep) the telephone apparatus;
2. Select type of ring;
3. Flash an LED;
4. Select the LED (to be flashed);
5. Turn on an LED;
6. Select the LED (to be turned on);
7. Turn-off an LED;
8. Select the LED (to be turned off).

Each of the above commands are defined by one byte. Note that two successive bytes are used for a complete instruction.

Typical signalling bytes which are sent from the microcomputer to the telephone system define on-hook and off-hook conditions and indicate the selection of line, function and dial keys by the operator.

Figure 2:
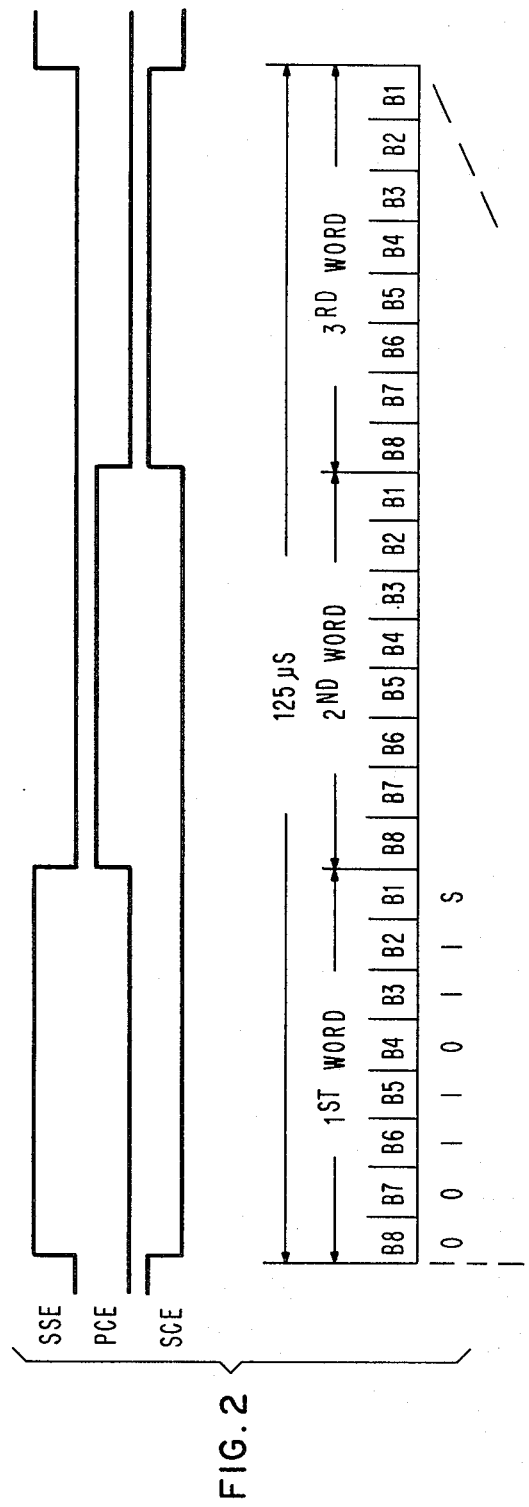
FIG. 2 is a timing diagram of a serial data frame employed in the apparatus of FIG. 1 and comprising three 8 bit words.
Figure 3:
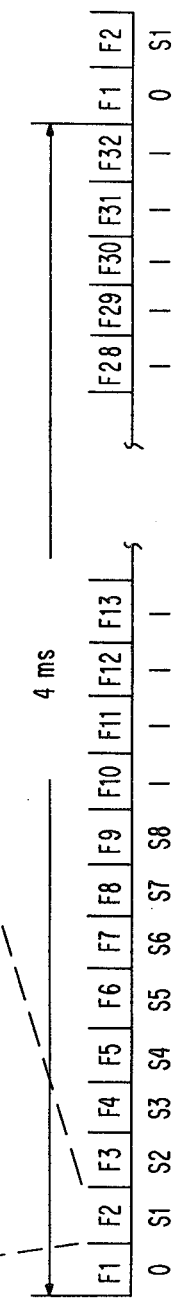
FIG. 3 is a timing diagram of a superframe employed in the apparatus of FIG. 1 and comprising 32 frames as shown in FIG. 2.

Frame format (FIGS. 2,3)

FIG. 2 shows an example of a frame format which may be used in the telephone apparatus according to the present invention. This example illustrates that, in principle, there exists no limitation on the number of PCM words in a frame. The number of words depends only upon the data rate used in this system. Obviously the data rate in kilobits per second (KB/sec.) must be matched to the needed speed in the telephone system to which the telephone apparatus is connected. In particular, the frame pattern must be synchronous with the PCM frame timing. In the described system, a multiple of the standard 8 KHz sampling rate is used.

Given the 8 KHz sampling rate—that is, one sample every 125 microseconds—the number of words (samples) in each frame and the number of bits per word (sample) determines the frequency of the data pulses. Conventionally, each sample is defined by 8 bits or a byte of information. In the preferred embodiment of the present invention the number of samples per frame is two.

Clearly, there is an upper limit to the frequency with which digital pulses may be transmitted to and from, and processed by the telephone apparatus. In particular, this upper limit is defined by the nature and length of the transmission line and the speed of the individual components of the telephone apparatus such as the transceiver, the synchronizer and, especially, the microcomputer. The telephone apparatus according to the present invention is designed for use with a 4,000 foot cable comprising two conventional twisted pairs of wires.

The standard PCM data rate of 64 KB/sec. (that is, the 8 KHz sampling rate times 8 bits per sample) sets the lower limit on the data rate of the telephone apparatus according to the invention. In addition to the PCM data it is necessary to transmit both synchronization and signalling information. Finally, if permitted by the maximum data rate, it is desirable to transmit at least one additional PCM voice of serial data stream.

According to the present invention, the telephone apparatus simultaneously transmits and receives one "frame" of information every 125 microseconds; that is, the standard PCM sampling rate for telephone systems. Each signal frame is divided into at least two equal, 8-bit time slots: one time slot for the synchronization and signalling information and at least one, but preferably two time slots for separate, independent channels carrying PCM voice data and/or digital data. With three time slots, the data rate is 3×64 KB/sec. or 192 KB/sec.

FIG. 2 shows the 125 microsecond frame divided into the three time slots. The three enable signals—sync/signalling enable SSE, primary channel enable PCE, and secondary channel enable SCE—are also shown to indicate their time relationship with the first, second and third words of the frame respectively.

The first seven bits (B8–B2) of the first word are set at the synchronizing code, which is preferably, alternately 0011011 and its inverse 1100100. The 8th bit (B1) in the first word, designated "S", is successively a start bit, one of 8 signalling bits and one of 23 top bits.

The second word of the frame contains a single PCM speech sample of 8 bits (1 byte). The third word may contain either a PCM speech sample or a digital data word of 8 bits (1 byte). These second and third words are transmitted via the internal data bus IB of the telephone apparatus between the transceiver DTR and the primary codec/PCM filter (for the second word) and the secondary codec PCM filter or the DDI (for the third word).

It will be understood that the frame format may comprise only the first two words, or it may comprise more than three words, thus correspondingly increasing the number of transmission channels. If only two words are provided, the data rate will be 2×64 KB/sec. or 128 KB/sec. If more than three words are provided, the data rate must be correspondingly increased to permit transmission on each channel at the 64 KB/sec. rate.

FIG. 3 shows a "superframe" of 32 frames, each identical to the frame shown in FIG. 2. Each superframe has a transmission time of 4 milliseconds.

The first frame F1 of the superframe contains a start bit or "0" in the B1 bit position of the first word. The next 8 frames contain the signalling bits S1,S2 ... S8 in this bit position. The following 23 frames contain stop bits, or a "1", in the B1 bit position. With this arrangment, one signalling byte is transmitted to and from the microcomputer every four milliseconds. During the time that the frames F10–F32 are transmitted and received, the microcomputer has time to control other functions of the telephone apparatus.

As will be appreciated from the discussion above, the frame format according to the invention facilitates the transmission of two or more independent and simultaneous voice and/or data channels within one PCM frame and without any buffering. Consequently this format makes possible the provision of additional features, such as additional connections to peripheral units, without any change in the existing telecommunication system.

The frame format according to the invention also permits the extraction of a clock signal from the data information with no phase jitter thus allowing coherent operation between facilities.

Finally, the frame format provides optimized bandwidth for digital data transmission and alleviates out-of-band radio interference.

The Encoding Technique Using "Alternate Mark Inversion" (AMI) FIGS. 4–7

The alternate mark inversion (AMI) encoding technique has been used for digital trunk circuits with both PCM24 and PCM30 systems. If this encoding technique also is preferably employed in the digital telephone apparatus according to the present invention, this does not limit the basic architecture of this apparatus to such an encoding technique. It will become apparent from the later description of the receiver unit of the transmitter and receiver circuits that just relatively simple changes of the design have to be made for adjusting this circuitry to be used with different transmitting schemes, as for example, with the so-called "Ping-Pong" scheme. The choice of different encoding and transmitting schemes also is dependent upon requirements of the data rate to be achieved.

However, according to the present invention, the combination in using a specific frame formatting technique as herein described before and the AMI encoding scheme also allows transmitting of data together with voice information in a frame format of more than two channels. Therefore, a greater amount of extensions and other peripheral units can be connected to the switch in parallel. Furthermore, pairs of two-wire lines can be used which are balanced simply by twisting each two-wire line. Thereby, a greater cable distance between repeaters can be achieved and the cross-talk attenuation between the twisted pairs, which is decreasing with the frequency, is optimized.

In the AMI encoding scheme, basically a pulse is sent for every logical level "1" and no pulse is sent for a logic level "0". In addition to that simple "mark" and "no mark" scheme, the polarity of the pulse is inverted for every second logic level "1" which is sent. Furthermore, preferably the generated pulses approximate a raised cosine wave shape rather than a strict rectangular wave shape in order to minimize the influence of high order harmonics.

With recent advancements in the state of the art, telephone apparatus such as digital subscriber stations and digital attendant consoles have been developed in conjunction with electronic telecommunication systems, especially with key telephone systems and electronic private automatic branch exchanges typically using PCM techniques for speech digitalization with data rates in the range of 64 to 256 KHz. For such applications, varying cable lengths of up to 4,000 feet between the electronic switch and different subscriber sets are usually taken into consideration. With respect to these requirements, the chosen encoding scheme has the following advantages: the high cross-talk attenuation of pairs of twisted two-wire lines allows the use of commercially available and relatively inexpensive cables such as 25-pair cables which are especially useful in conjunction with multiple digital sucscriber sets. Even with the mentioned variety of cable lengths stemming from the different loop lengths in the range of up to 4,000 feet, the circuitry can be designed such that no adjustments in the transmitter/receiver circuits are required to accomplish transmitting information across those different loop lengths. This is very important with respect to small implementation and installation costs. The transceiver unit also can be implemented with small outlay and still meet FCC requirements, since with this encoding scheme commercially available and just a few hardware components are required which need no specific measures for ventilating and take up minimal space.

Digital Transmitter/Receiver Unit (Transceiver) FIGS. 4–7

Figure 4:
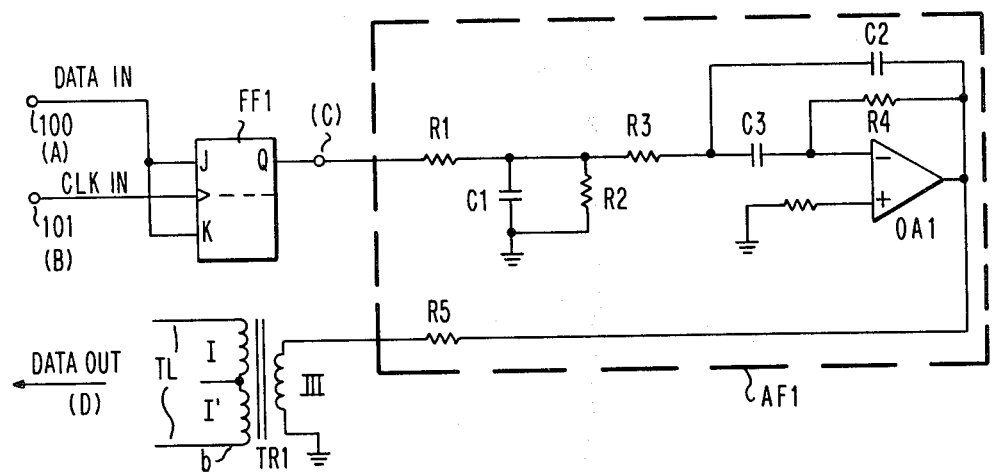
FIG. 4 is a schematic diagram of the transmitting portion of the digital transceiver shown in FIG. 1.
Figure 5:
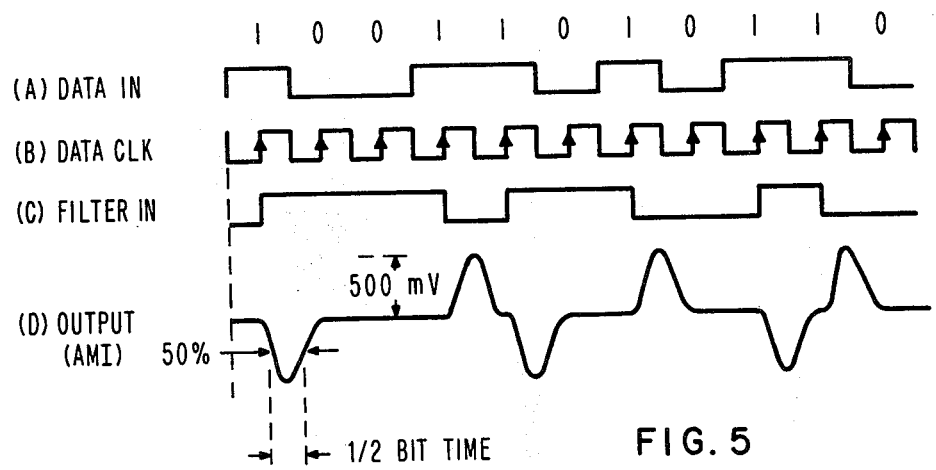
FIG. 5 is a timing diagram of a number of signals appearing in the transmitter shown in FIG. 4.
Figures 6, 6A:
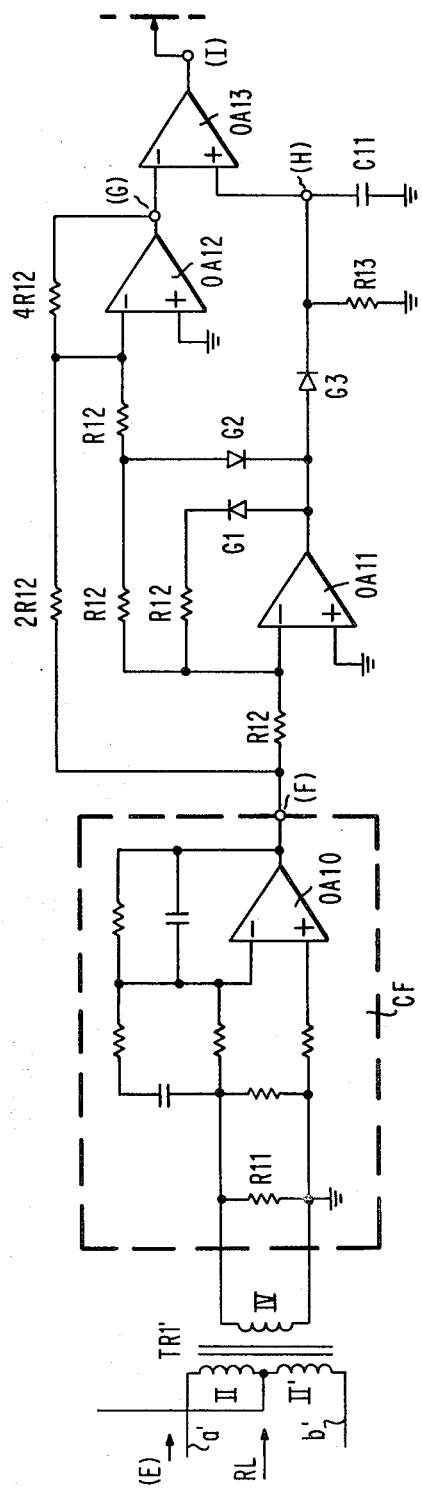
FIGS. 6, 6A, and 6B show a schematic diagram of the receiving portion of the digital transceiver shown in FIG. 1.
Figure 7:
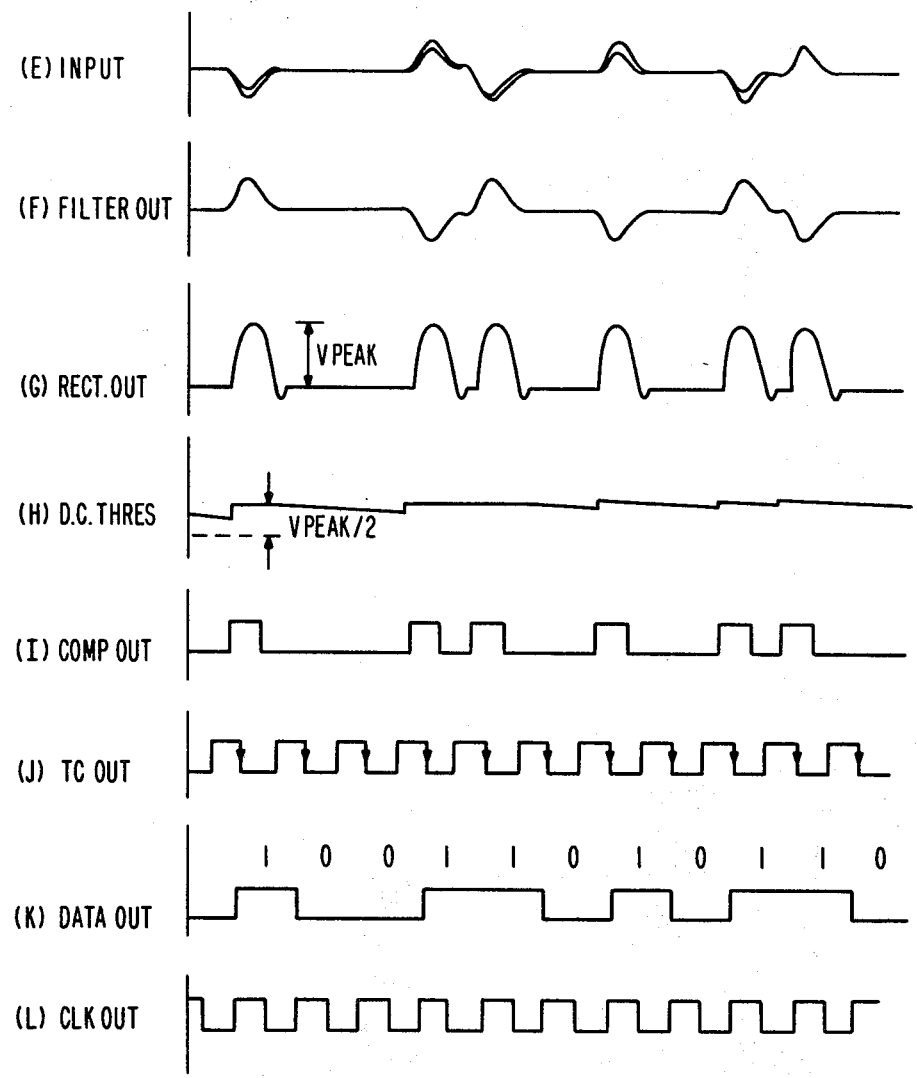
FIG. 7 is a timing diagram of a number of signals appearing in the receiver shown in FIG. 6.

In the block diagram of the architecture of the digital telephone apparatus of FIG. 1, the digital transmitter/receiver unit DTR has been shown in one block; for a better comprehension this transmitter/receiver unit DTR has been broken down into a transmitter unit DT and a receiver unit DR which are shown in detail in FIG. 4 and FIG. 6, respectively. FIGS. 5 and 7 represent respective timing diagrams of the transmitter unit DT and the receiver unit DR. In conjunction with the description of the block diagram of FIG. 1, it has been pointed out that the digital transceiver DTR is connected to the four-wire transmission line by the transformer TR1 for transmitting digitalized voice data, other digital data information, signalling information, and last but not least, synchronizing bits via the two wires of the transmission line TL by use of the primary windings I, I' and the secondary winding III. For receiving the same items of information the two wires of the receiving line RL are connected to the primary windings II, II' and thereby coupled to the secondary winding IV of the transformer TR1'.

The schematic of FIG. 4 representing the transmitter unit DT also shows the primary windings I, I' and the secondary winding III of the transformer TR1 and the two-wire pair a, b of the transmitting line TL. The transformer TR1 has an impedance transformer ratio of 1:4.

Schematically indicated are a first input 100 for serially incoming data and a second input 101 for receiving data clock pulses. In view of the block diagram shown in FIG. 1, it has to be understood that these inputs 100, 101 represent the respective inputs of the digital transceiver DTR connected to the internal data bus IB, thereby receiving clock pulses and serial data from the primary and secondary codec PCM filters PCF and SCF, or from peripheral units such as the additional data system DDI.

The digital transmitter unit DT is provided with a JK flip-flop FF1 which is used as a toggle flip-flop, since both the J-input and the K-input of the flip-flop are commonly connected to the serial data input 100. The operation of the JK flip-flop FF1 is controlled by the train of data clock pulses received at the clock input 101. A normal Q-output of the JK flip-flop FF1 generates by means of the toggle function of the JK flip-flop data signals in the form of step functions in synchronism with the data clock pulse train. This characteristic is represented in the first three wave forms of FIG. 5. The reference symbols A through D at the left-hand margin are related to correspondingly labelled test points in FIG. 4 where these wave forms appear. Line A represents serially incoming data, line B the data clock pulse train and line C the data signals as generated at the Q-output of the JK flip-flop FF1. The wave forms of line A and line C represent the same series of items of data wherein each signal level "1" of the diagram in line C comprises a step function.

The output signals of the JK flip-flop FF1 have to be transformed into AMI encoded signals in the shape of a raised cosine wave form. This is achieved by a first active filter AF1 which is inserted between the output of the JK flip-flop FF1 and the secondary winding III of the transformer TR1. The active element of this filter is a first operational amplifier OA1 having an RC input network and a multiple feedback circuit. By means of this implementation the filter represents a shaping filter with a 1-pole band pass characteristic and a 1-pole low-pass characteristic, which attenuates the higher order harmonics of the input signal. The values of the filter components are selected in conventional manner such that the open loop gain of the operational amplifier OA1 is at least 30 dB at data rate frequency. The positive and negative pulses are extremely symmetrical and approximate raised cosine pulses having a level of about 4 volt peak-to-peak at the output of the active filter AF1. The pulses are one-half of a bit time wide at their 50% amplitude points for optimum data recovery and clock reconstruction at the receive end.

The output transformer comprising the secondary winding III and the first primary windings I, I' provides a means for feeding or receiving direct current power over the transmission line TL; this design is such that 40 dB longitudinal balance over the range of 20 KHz to 200 KHz is obtained. This prevents the transmission line from acting like an antenna. The wave form of the signal fed to the transmission line TL via the secondary winding III and the primary windings I, I' is represented in line D of FIG. 5. This pulse diagram shows all the characteristics of data signals to be transmitted via a transmission line TL. The binary information is AMI-encoded and the basic wave shape is formed such that the pulses resemble raised cosine wave forms rather than rectangular pulses. As pointed out, the pulses are about one half of a bit time wide between the two 50% amplitude values, whereas each pulse in general is smaller than the full bit time such that the transfer of positive and negative pulses is achieved properly.

The second main unit of digital transceiver DTR forms the receiving part for processing the receiving data signal train. The main objects of this receiver unit DR are to recover from the incoming signal information a precise, stabilized clock pulse train and to detect the digital data information and convert it into the form of a bipolar, rectangular wave shape.

Figure 6B:
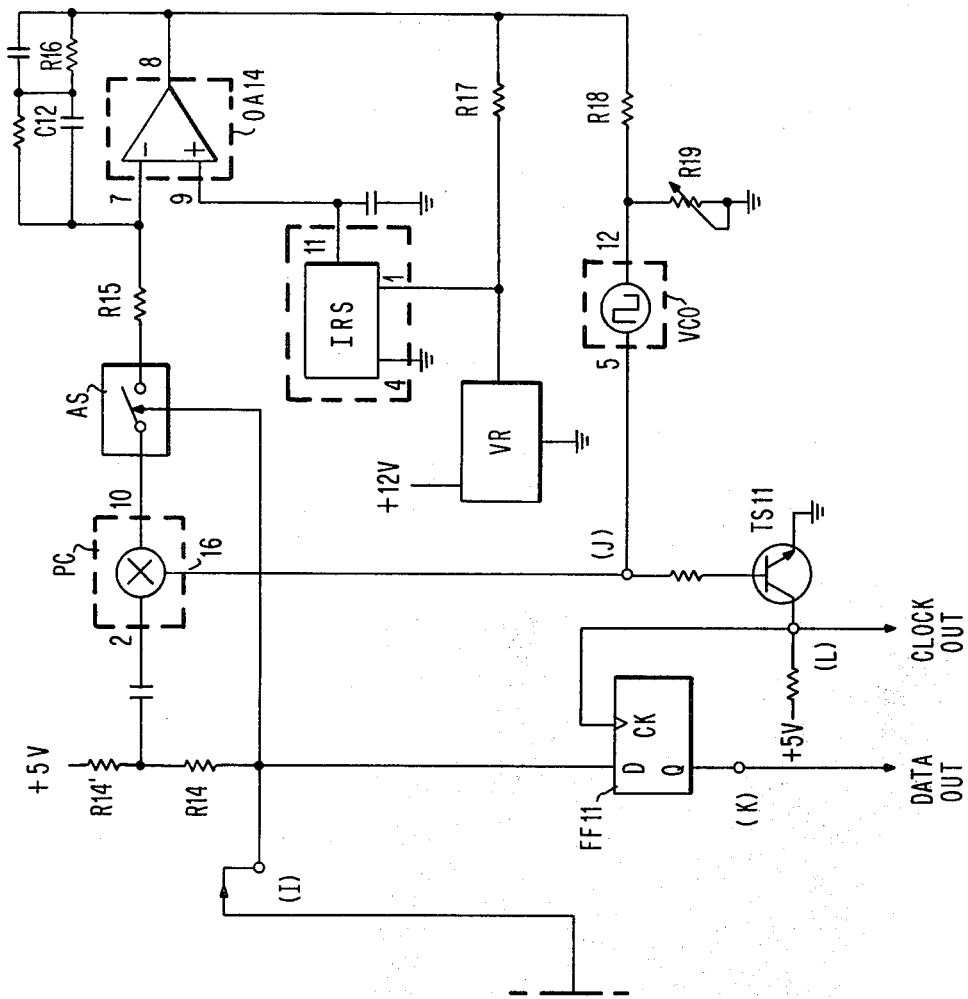

The detailed circuit diagram of the receiver unit is shown in two related FIGS. 6A and 6B. The arrangement of both figures with reference to each other is schematically indicated in FIG. 6.

At the left-hand margin of FIG. 6A there is represented the transformer TR1' with the primary windings II and II' and the secondary winding IV. The primary windings are connected to the two wires a' and b' of the receiving line RL. The transformer has the aforementioned impedance transforming ratio of 1:4. All information received across the two wire pair a', b' of the receiving line RL is supplied to a compensation filter CF which is designed for eliminating distortions of the received digital signals and minimizing out-of-band interferences. The clean signal pulse train will then be processed furthermore in a pulse detector circuit including a full wave rectifier, an AC/DC converter and a comparator. In FIG. 6B it is shown that the output signals of the comparator are supplied to a D flip-flop forming the output stage for the serial digital data stream on the one hand and to a sampling circuit for recovering a clock pulse train.

A detailed description of the different components of the receiving unit DR of the digital transceiver DTR will now be given with reference to FIGS. 6A and 6B, respectively, in conjunction with timing diagrams shown in FIG. 7 which refer to different wave forms of signals appearing at specific test points of the circuitry which are referenced by letters E through L. It has been pointed out that different loop lengths of up to 4,000 feet between the electronic switch and different subscriber sets have to be taken into consideration. According to this variety of loop lengths the signal pulse train which is received from the receiving line RL is more or less distorted. The timing diagram E in the first line of FIG. 7 represents such an input signal pulse train in a wave shape as it occurs at the input side of the transformer TR1'. The wave shapes of the signals in the timing diagram E are shown in full lines with with varying amplitudes thereby indicating that amplitudes and wave shapes may vary dependent upon the history of the received signal. For obtaining a more general understanding it may be mentioned that the transmission line for the digital signals, here represented by the receiving line RL, tends to attenuate high frequency components, and therefore, has to some extent a characteristic of low-pass line.

Matching these input conditions, the compensation filter CF is designed as an active filter including another operational amplifier OA10. In the input circuitry of this operational amplifier there is arranged in parallel to the secondary winding IV of the transformer TR1' an impedance transforming resistor R11 which is grounded at a connector tap coupled to the non-inverting input of the operational amplifier OA10. The remaining parts of the input network of the second operational amplifier OA10 form a RC network of relatively high impedance which has basically low-pass characteristics. A multiple feedback circuit of the operational amplifier OA10 primarily consists of a parallel RC circuit which results in a high-pass feedback. This design conventional to those familiar with active filters provides a compensation filter CF with a characteristic having at least to some extent a gain in the frequency range of up to 100 KHz and creating a small loss at higher frequencies of up to 200 KHz. Thereby, maximum performance is achieved in this frequency band. At the output of the operational amplifier OA10 which is identical with the output of the compensation filter CF, an undistorted inverted output signal pulse train occurs. This wave form is shown in the second line of FIG. 7 as indicated by the reference symbol F.

The following sub-unit of the receiver part of the digital transceiver above all serves to convert the bipolar output signals of the compensation filter CF into unipolar rectangular pulses. There is arranged a third operational amplifier OA11 having an input load resistor R12 and a first and a second feedback circuit each including another resistor R12 connected in series with a diode G1, G2, respectively. Both diodes are connected in anti-parallel to the output of the operational amplifier OA11. This implementation is such that for both positive and negative values of the input signal the operational amplifier just operates as an inverting switch.

The connecting point between the second diode G2 and the second feedback resistor R12 furthermore is coupled to another load resistor R12 connected to the inverting input of a fourth operational amplifier OA12. The non-inverting input of this operational amplifier is grounded. The inverting input of this operational amplifier OA12 also is connected by another resistor 2R12 to the output of the compensation filter CF on the one hand and to a feedback circuit including a further resistor 4R12 on the other hand. As indicated by means of the reference symbols of the resistors the circuit implementation is such that the resistances are multiple integrals, this is by the way of an example, if R12 equals 5K Ω, then 4R12 will be 20K Ω.

The operational amplifier arrangement forming a full wave rectifier is implemented in a conventional manner and is relatively straightforward. An analysis of the circuit, therefore, is relatively easy to those skilled in the art. A positive-going input signal occurring at the output of the compensation filter CF drives the output of the third operational amplifier OA11 negative and the second diode G2 becomes conductive. The opposite applies to an input condition when a negative-going pulse occurs. The basic amplification factor of the rectifying operational amplifier OA12 in both cases is determined by the ratio of the feedback resistor 4R12 and the respective effective resistors of the input circuit of this operational amplifier and has an absolute value of 2. The only difference is that the output signal is in phase with a positive-going input signal whereas the output signal is out of phase by 180° when the input signal is negative. Thus, a unipolar signal train is generated at the output of the rectifying operational amplifier OA12 which is represented by the wave forms in line G of FIG. 7.

The third operational amplifier OA11, furthermore, has a specific object in conjunction with an output circuit including a third diode G3 connected by its anode to the cathode of the second diode G2 and including a parallel RC circuit comprising a further resistor R13 and a capacitor C11 which are connected to ground. The values of this RC circuit are chosen such that a fairly high time constant is established which generates a variable DC threshold signal at the cathode of the third diode G3. The wave form of this threshold signal is shown in line H of FIG. 7.

This threshold signal is applied to the non-inverting input of a voltage comparator OA13 which inverting input is connected to the output of the rectifier stage, that is, the output of the fourth operational amplifier OA12. The fifth operational amplifier OA13 thus forms a pulse detection stage under control of a variable DC threshold voltage which is kept at one-half the peak amplitude of the unipolar pulses occurring at the output of the rectifying operational amplifier OA12 and represented in line I of FIG. 7. Thus, within a relatively wide dynamic range of about 20 dB the detector generates, in case of an input signal which represents a signal level "1", a pulse of a length of one half of a bit time.

It should be indicated that the perfomance of the pulse recovering scheme, at least to some extent, is dependent upon the characteristics of the diodes involved. These diodes have relatively low reverse leakage and moderately fast switching characteristics. The first diode G1, as well as providing feedback to the second operational amplifier OA11 on positive output swings, balances the voltage drop at the third diode G3, thereby achieving linear tracking between the threshold voltage and the peak amplitude of the unipolar pulses at the inverting input of the comparator OA13.

The circuit shown in FIG. 6B which is connected to the output of the voltage comparator OA13 (shown in FIG. 6a) mainly has the object to reconstruct the 192 KHz clock and to generate an output data pulse train synchronized with the clock. Prior to a detailed description of the respective circuitry it may be useful to analyze the signal pulse train occurring at the output of the voltage comparator OA13 for obtaining a better background understanding of the purpose of this circuitry.

The output signals of the comparator stage as shown in line I of FIG. 7 represent rectangular pulses of a signal level "1" in a random order. Since "zero" bits in the stream of data are not accompanied by a change of the signal level, the clock pulse has to be recovered entirely from the pulses representing data bits with signal level "1". Long strings of data bits with signal level "0", therefore, are a worst case which has to be taken into consideration and which must not affect the clock recovering scheme. For implementing the clock recovering scheme a phase-locked loop circuit is employed which is designed for sampling each consecutive pulse at the output of the fifth operational amplifier OA13 and for maintaining signal condition without any change until the next pulse occurs. This simply means that the information between two consecutive pulses is skipped by a sampling circuit.

A series of pulses occurring in a random order in view of its frequency spectrum also is a relatively complex subject matter. It may be well understood by those skilled in the art that a poorly designed phase-locked loop circuit in this situation could be locked onto a frequency which is higher or lower than the 192 KHz pulse train. The clock frequency, however, is the far most significant frequency in the spectrum of a continuous string of data bits of signal level "1". To maximize the energy in the spectrum at the clock frequency of the transmitted signal the compensating filter and the pulse detection stage have been designed such that the pulse at the output of the voltage comparator OA13 are approximately one-half the bit time wide.

Based upon this introduction the clock reconstructing circuit will now be described in detail with reference to FIG. 6B. The output of the pulse detection stage represented by the voltage comparator OA13 is connected via a voltage divider comprising further resistors R14 and R14' to supply voltage, on the one hand, and to the information input of a D flip-flop FF11 on the other hand. A connector tap of both resistors R14 and R14' is coupled via a further capacitor to an input of a quadrature phase comparator PC having an output labelled 10 and a control input 16.

The output is connected to the inverting input of a fifth operational amplifier OA14 via an analog switch AS and a load resistor R15. The analog switch is controlled by the output signal of the fifth operational amplifier OA13. The sixth operational amplifier OA14 is provided with a multiple feedback circuit including a further capacitor C12 and a further resistor R16 which are arranged in series. A small capacitor is in parallel with resistor R16 to filter mixer harmonics present in the output of phase comparator PC. A very large value resistor in parallel with capacitor C12 provides a DC path to the inverting input of the amplifier OA14 when the analog switch AS is opened. Thus, the fifth operational amplifier OA14 and its feedback network operate as an integrator, straight amplifier, or low pass filter depending on the frequency of the input signals passed to the inverting input of the fifth operational amplifier OA14. The non-inverting input of the fifth operational amplifier OA14 is supplied with a DC signal generated by an internal reference source IRS. The output of the operational amplifier OA14 is coupled by a further series resistor R16 to a current control oscillator CCO which output also is directly connected to an input of the internal reference source IRS. The output of the sixth operational amplifier OA14, furthermore, is connected to ground via a further resistor R17 and an adjustable resistor R18 which are arranged in series. The connector tap between both resistors is linked by a threshold circuit TC to the control input of the phase comparator PC and, in addition to it, to the base of a transistor TS11 having a grounded emitter and a collector forming an output of the recovered clock pulse train.

It may be mentioned that the devices of this phase recovering circuit are entirely composed of commercially available components and integrated circuits. In fact, the phase comparator PC, the operational amplifier OA14, the internal reference source IRS and the voltage controlled oscillator VCO are integrated together into one phase-locked loop device manufactured by EXAR as its device 2212. This is indicated in the drawing by blocks in dotted lines and by pin reference symbols of the manufacturer. The voltage regulator VR can be implemented by a device 78L05 of National Semiconductor Corporation. It is, therefore, deemed not to be necessary to describe the function of this pulse recovering scheme in all details, since the basic requirements and the mode of operation to be achieved have been explained in the introductroy section of this circuit. Some special characteristics, however, will be pointed out in the following.

The analog switch AS is closed whenever a pulse representing a data bit of signal level "1" occurs at the output of the voltage comparator OA13. Thereby the output of the phase comparator PC is sampled and the phase error sample is applied to the input resistor R15 connected to the inverting input of the fifth operational amplifier OA14. Amplifier OA14 in turn changes capacitor C12 for a duration of time equal to the width of the error sample with a direction determined by the polarity of the error sample. The voltage across C12 changes the frequency of the voltage controlled oscillator VCO in a direction which minimizes the phase error. The zero phase error point for the combination of the quadrature phase comparator PC and the analog switch AS occurs when the positive transistion of the voltage controlled oscillator output is in the middle of the output pulses from the voltage comparator OA13. This timing, in turn, is the optimum time for deciding whether a data pulse having a signal level "1" at the output of the voltage comparator OA13 has occurred.

The output signal of the sixth operational amplifier OA14 is applied to a resistor network including resistors R18 and R19. Resistor R19 determines the center frequency of the phase-locked loop circuit by means of the voltage drop across the resistor which voltage is effective at the input of the threshold circuit TC. The series resistor R18 then specifies the upper and lower boundaries, or, in other words, the maximum deviation from the center frequency.

The output signal of the voltage controlled oscillator VCO as indicated by the reference symbol J is represented in the wave form of line J of FIG. 7. This signal is applied to the control input of the phase comparator PC and is amplified and, above all, inverted by means of the transistor TS11. The transistor output signals form the recovered clock pulse train which is shown in line L of FIG. 7. This clock pulse train also is used to control the D flip-flop synchronizing the stream of data bits occurring at the output of the comparator stage with the recovered clock pulse train.

Figure 8:
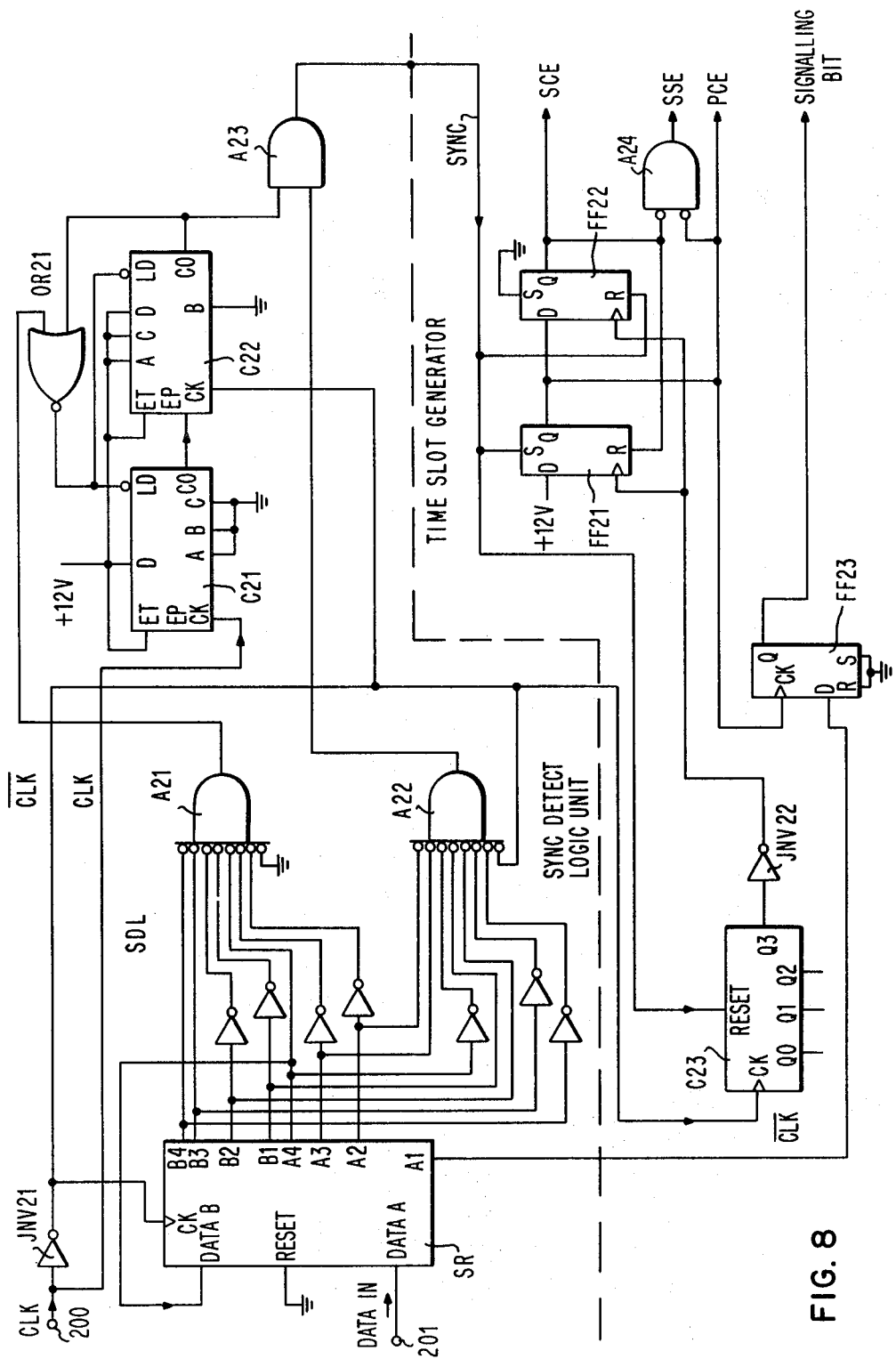
FIG. 8 is a schematic diagram of the serial frame synchronizer shown in FIG. 1.
Figure 9:
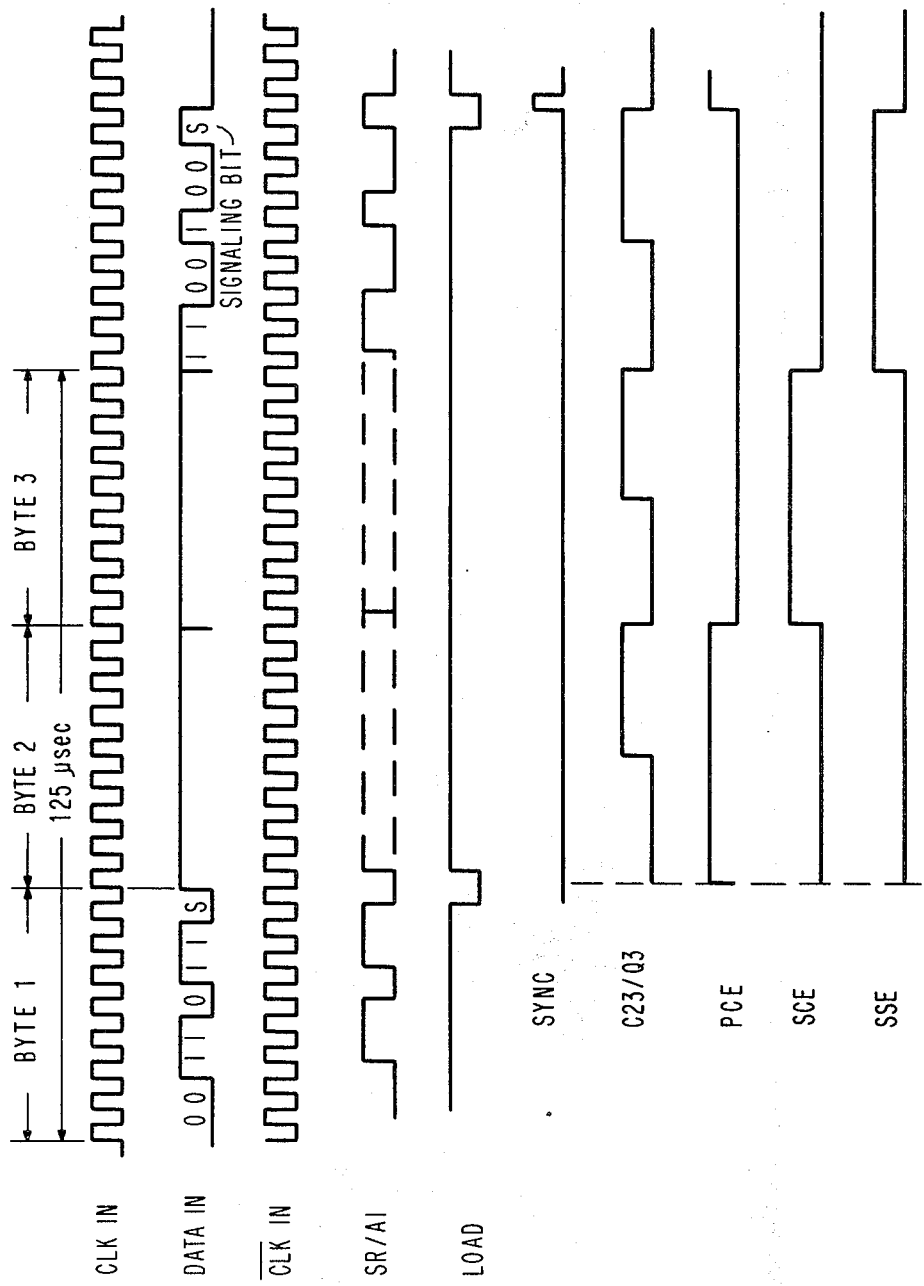
FIG. 9 is a timing diagram of a number of signals appearing in the serial frame synchronizer shown in FIG. 8.

Serial Frame Synchronizer SFS (FIGS. 8, 9)

It has been pointed out that the serial data rate, employed in the digital telephone apparatus according to the present invention, is 192 Kbit/sec. With reference to FIGS. 2 and 3, it has been described that each serial data frame format includes three bytes, each comprising eight bits. In each frame format one of these bytes has the characteristic of the synchronizing/signalling byte composed of seven synchronizing bits and a signalling bit.

By means of the synchronizing bits, the frame formats of a continuous serial data stream can be detected by the serial frame synchronizer SFS. By evaluating the time of the occurrence of the synchronizing bits within the serial data stream the three bytes of a frame format which are generated and transmitted independently of each other are identified. For this reason the seven bit code which consists of the synchronizing bits has to have very low correlation with any encoded data information neither normal data information nor an idle channel code. Statistical studies have proved that the bit series of 0011011 does follow these requirements. Accordingly, the inverted synchronizing bit code comprises of the series 1100100.

The serial frame synchronizer is mainly composed of three sub-units, a serial-to-parallel converter for converting the information received at the serial data stream into a parallel 8-bit format, a logic unit for continuously evaluating the current state of the serial-to-parallel converter and a time slot generator for producing under control of a synchronizing pulse three output signals each occurring concurrently with a respective one of the three bytes of a frame.

In accordance with the block diagram of FIG. 1, the serial frame synchronizer SFS receives a 192 KHz clock at a clock input 200 and serial data at a data input 201. Forming the serial-to-parallel converter in the serial frame synchronizer SFS there is arranged a shift register. SR. The shift register SR is implemented as a double four-bit shift register with two corresponding serial data inputs DATA A and DATA B, respectively and two sets of four parallel outputs A1 through A4 and B1 through B4. These two four-bit shift registers are cascaded by short-circuiting the most significant output A4 of the first stage with the second serial data input DATA B. The first serial data input DATA A is connected to the data input 201 of the serial frame synchronizer SFS. The operation of the shift register SR is controlled by clock signals $\overline{CLK}$ which are inverted by an inverter I21 with respect to the clock signal pulse train CLK supplied to the clock pulse input 200. For detecting the seven synchronizing bits of a frame format there is arranged the synchronizing detect logic unit at the output of the shift register SR. It comprises a straightforward logical network composed of a series of inverters and two AND-gates A21 and A22. Each of the inverted inputs of the AND-gates is coupled to a respective one of the most significant parallel outputs A2 through A4 and B1 through B4 of the shift register SR either directly or by one of the inverters. The AND-gates A21 and A22 thus are all zero detectors and are alternatively supposed to be operative if the current state of the shift register SR reflects either the normal or the inverted synchronizing bit pattern.

It has been described hereinbefore that consecutive frames have the characteristic that alternatively a normal and the inverted synchronizing bit pattern occurs. For fail-safe operation, it is now evalutated that for two consecutive frames both the normal and the inverted synchronizing bit pattern occur within a given distance determined by the data frame format. This is achieved by counting the clock pulses occurring after having detected one of the synchronizing bit patterns and by evaluating the status of the shift register SR one pulse frame later if then the inverse synchronizing bit pattern is present.

To perform this operation there is arranged at 24-bit counter in accordance with the chosen frame format which is implemented by means of two cascaded 16-bit counters C21 and C22. The first counter C21 is controlled by the 192 KHz clock signal CLK received at the clock pulse input 200 of the serial frame synchronizer SFS. It produces a carry output signal at its carry output CO when the maximum count is reached. This output signal is fed as a count-enable signal to a count enable input EP of the second counter C22 which is controlled by the inverted clock pulses $\overline{CLK}$. Both counters are preset in common to a predetermined starting count by a preset signal applied in parallel to their load inputs LD. This preset signal is generated at the output of an OR-gate OR21 having two inputs each connected to a respective one of the outputs of the first AND-gate A21 and the carry output CO of the second counter C22. Thus, an output signal at the carry output CO of the second counter C22 occurs whenever 24 bits of the 192 KHz clock pulse train have passed. In other words, the signal condition of the first AND-gate A21 detecting a synchronizing bit pattern is buffered for exactly one pulse frame and is then appearing at the carry output CO of the second counter C22.

At this time, the second AND-gate A22 of the synchronizing detector logic unit is supposed to carry a signal of signal level "1", if the bit pattern occurring one pulse frame earlier in fact was a synchronizing bit pattern. The signals occurring at the carry output CO of the second counter C22 and the second AND-gate A22 are logically linked by a further AND-gate A23 which produces an output signal of signal level "1" occurring exactly once after each series of 48 pulses of the 192 KHz clock pulse train CLK. This output signal of the AND-gate A23 is the synchronizing signal SYNC locking the serial data stream to the correct frame format.

The described circuit is implemented with a minimum of hardware and has a very high noise immunity. Once both synchronizing bits in form of the output signals of the AND-gates A21 and A22 are detected, the circuit remains locked with these synchronizing bits. The only time that the circuit may lose synchronization is when the synchronizing signal is slipped. But any noise associated with the synchronizing bits will not cause the circuit to loose synchronization once the synchronized status is detected.

The synchronizing signal SYNC controls the time slot generator for locating the three different bytes in a frame by means of the three timing signals "Synchronizing/Signalling Enable" SSE, "Primary Channel Enable" PCE, and "Secondary Channel Enable" SCE. Each of these signals occurs one after the other and specifies during its signal level "1" a time period for the occurrence of a respective one of the three bytes of a frame.

For obtaining this operation the time slot generator is provided with a further 8-bit counter C23 which receives the inverted clock pulses $\overline{CLK}$ at its clock input. The counter is designed as a divide-by-eight counter and produces at its Q3 output a 24 KHz pulse train which is inverted by a further inverter I22 and, in common, applied to clock inputs of two further D flip-flops FF21 and FF22. A Q-output of the first flip-flop FF21 of the time slot generator is connected to the D-input of the second flip-flop FF22. The Q-output of the second flip-flop FF22 is connected to the reset input of the first flip-flop FF21 of the time slot generator. Thus, resetting of the first flip-flop FF21 is accomplished whenever the second flip-flop FF22 is set.

As will be explained in the following the first flip-flop FF21 in its set condition generates the primary channel enable signal PCE whereas the second flip-flop FF22 in its set condition carries the secondary channel enable signal at its Q-output. Both signals are applied to a respective one of the inverted inputs of a further AND-gate A24 which is operative if both the primary channel enable signal PCE and the secondary channel enable signal SCE are at signal level "0". Thus, the output signal of this further AND-gate A24 generates the sync-/signalling enable signal SSE.

In the time slot generator there is provided a further D flip-flop FF23 having a data input D connected to the least significant output A1 of the shift register SR and a clock input which is connected to the Q-output of the first flip-flop FF21 of the time slot generator. The D flip-flop FF23 operates as a synchronizer for detecting the signalling bit which is present at the least significant output of the shift register at a time concurrently with the rising edge of the primary channel enable signal PCE.

The operation of the serial frame synchronizer which implementation has been described hereinbefore will now be pointed out with reference to various timing signals shown in FIG. 9. The first line represents the 192 KHz clock pulse train CLK as applied at the clock input 200 to the serial frame synchronizer SFS. The stream of serially incoming data which is received at the data input 201 of the serial frame synchronizer is shown in the second line of FIG. 9. In the left hand and the right hand margin of this pulse train is assumed that two consecutive patterns of synchronizing bits appear. Derived from this signal condition, the alignment of the frames is indicated on top of FIG. 9. The third line of FIG. 9 shows the wave form of the clock pulse train in inverted form which is referenced as $\overline{CLK}$.

These three pulse trains form the input signals of the serial frame synchronizer SFS from which signals all the remaining wave forms shown in FIG. 9 are derived. The fourth line of FIG. 9 represents the operation of the shift register SR by means of the output signal occurring at the least significant output A1 of the shift register SR. As to be seen from comparison with the data stream shown in line 2, the output pulses have a delay of half the bit time which is resulting from controlling the shift register SR by the inverted clock pulses $\overline{CLK}$. In the fourth line there is shown the timing of the load pulses applied to the counter C21 and C22 which pulses are produced at the output of the OR-gate OR21. These signals occur if the signal pattern at the most significant outputs A2 through A4 and B1 through B4 of the shift register SR reflects the synchronizing bit pattern. The signals also can be determined by the carry output signal of the second counter C22 of the serial frame synchronizer. These signals occur in a synchronized mode of operation every 24 bits of the inverted clock pulse train $\overline{CLK}$.

The sixth line shows the timing of the synchronizing bit SYNC which is identical with the output signal of the AND-gate A23. This signal is applied to both a reset input of the third counter C23 and the set input of the first D flip-flop FF21 of the time slot generator. Thus, the third counter C23 is reset to zero and will carry an output signal at its Q3-output eight clock pulses later. At the same time the first D flip-flop FF21 is set thereby generating at its Q-output the primary channel enable signal PCE. The next "1" to "0" transition of the output signal of the third counter C23 enables the second flip-flop FF22 of the time slot generator to load the data information applied to its data input D. The second flip-flop in its set condition generates the secondary channel enable signal SCE and a rest signal for the first flip-flop FF21. Thereby it is accomplished that the next following transition from "1" to "0" level of the output signal of the third counter C23 cannot reactivate the first flip-flop FF21 which status, therefore, remains unchanged for two consecutive clock pulses.

The same clock pulse however which is blocked at the first flip-flop FF21 drives the second flip-flop FF22 into its reset state. Thereby, the secondary channel enable signal is turned off and furthermore the first flip-flop FF21 of the time slot generator becomes unlocked and can be set again by means of the following clock pulse. Since both flip-flops FF21 and FF22 are thus reset for a period of eight 192-KHz-clock pulses between the trailing edge of the secondary channel enable signal SCE and the rising edge of the primary channel enable signal PCE, the sync/signalling enable signal SSE will be generated at the output of the AND-gate A24. The timing of the three enable signals PCE, SCE and SSE may be obtained from lines 8–10 of FIG. 9.

Figure 10:
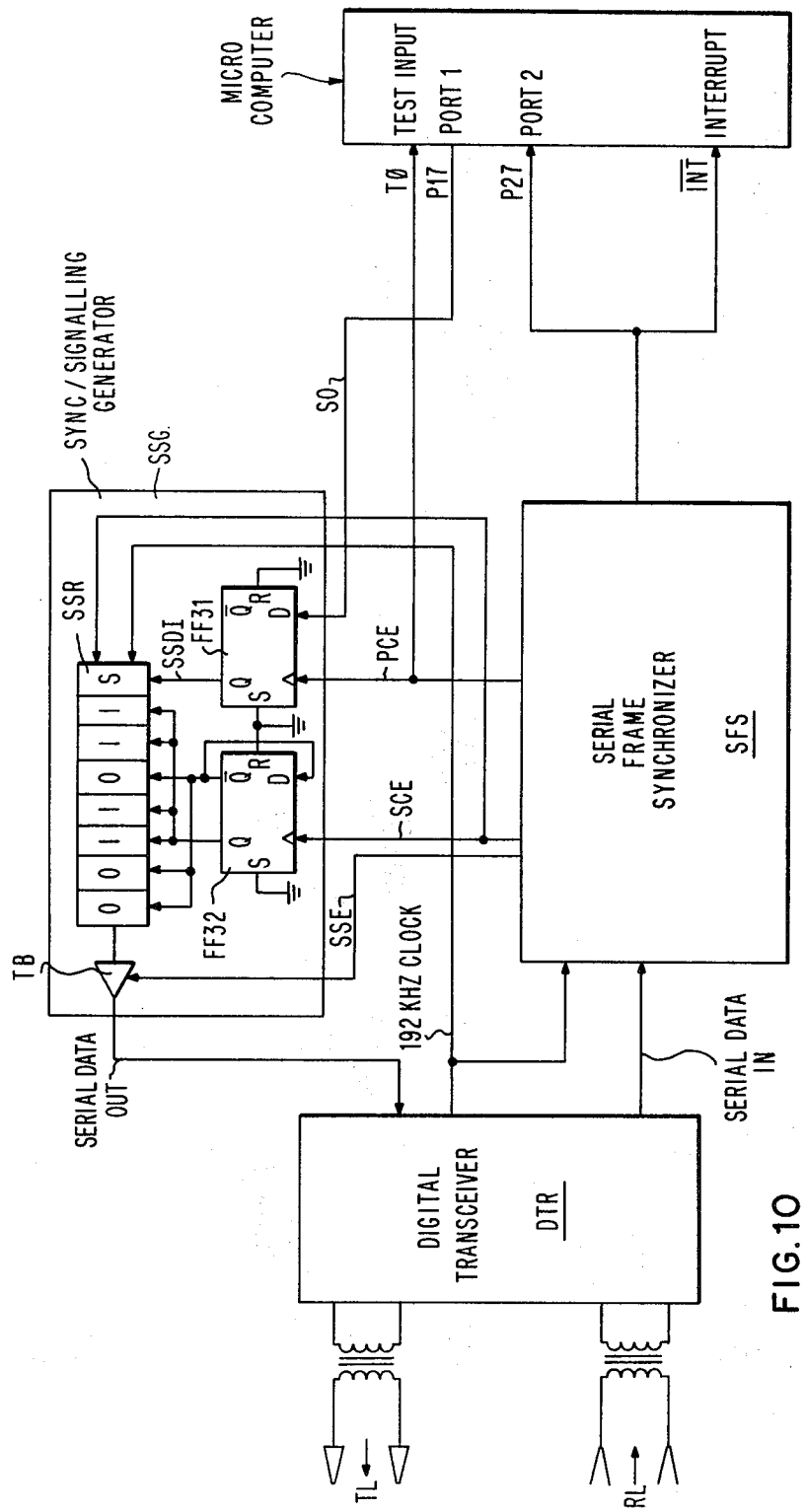
FIG. 10 is a schematic diagram of the sync/signalling generator shown in FIG. 1.
Figure 11:
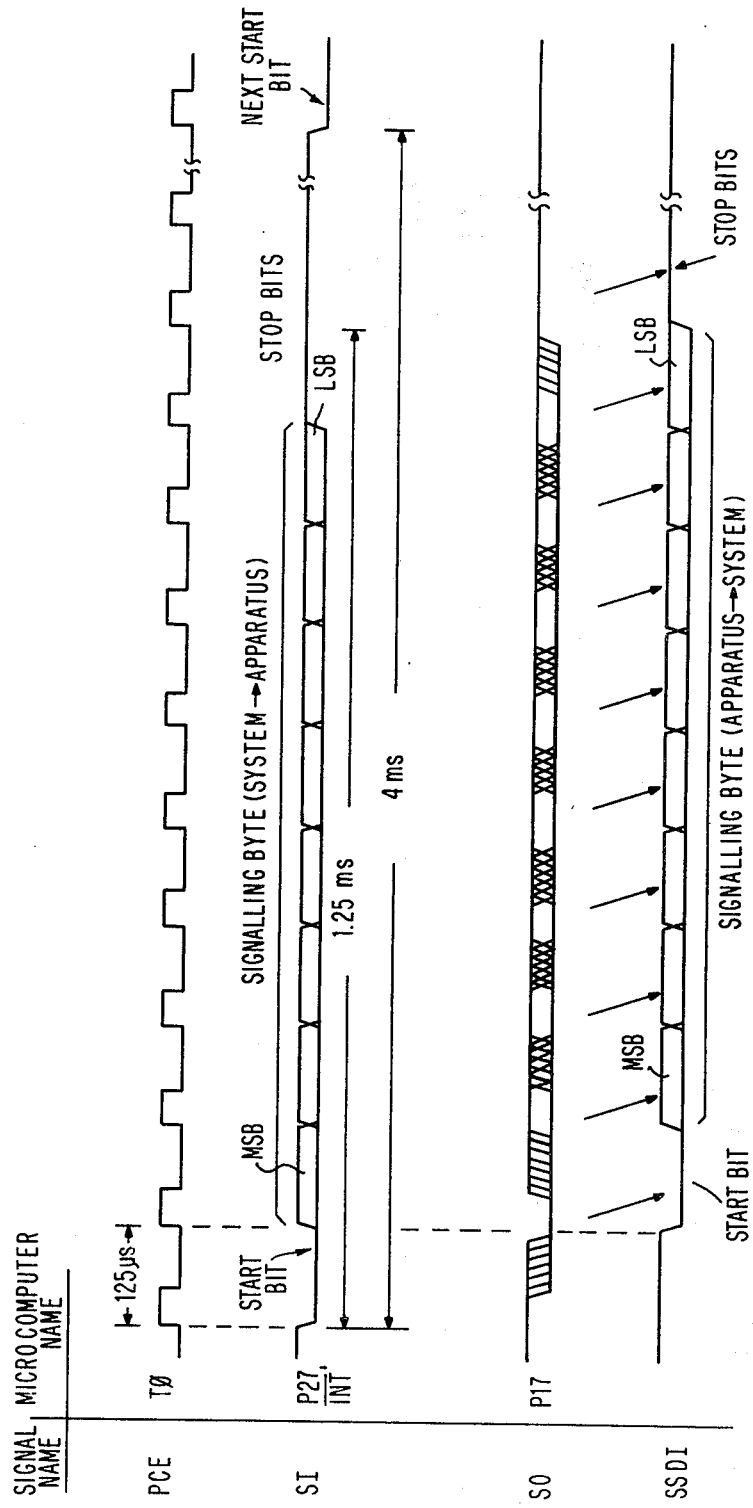
FIG. 11 is a timing diagram of a number of signals appearing in the sync/signalling generator of FIG. 10.

Sync/Signalling Generator (FIGS. 10 and 11)

The internal structure of the sync/signalling generator SSG, as well as its interrelationship with the digital transceiver DTR, serial frame synchronizer SFS and the microcomputer M is shown in FIG. 10. As noted above, the digital transceiver passes digital data in the prescribed frame format to the serial frame synchronizer SFS via the "serial data in" line of the internal data bus. The digital transceiver also receives digital data in this frame format via the "serial data out" line of the internal data bus for transmission on the telephone line TL. Finally, the digital transceiver generates a 192 KHz clock signal from the signals received from the transmission line RL. The 192 KHz clock is passed to both the sync/signalling generator SSG and the serial frame synchronizer SFS, as well as to other components of the digital telephone apparatus (not shown in FIG. 10).

The serial frame synchronizer SFS passes one bit of each 125 microsecond frame to both the P27 input port and the OVS,/INT/ interrupt input of the microcomputer M. This bit appears in the B1 bit position of the first data word in the frame and may be a start bit, a signalling bit or a stop bit.

As explained previously, the serial frame synchronizer produces three enable signals: sync/signalling enable SSE, primary channel enable PCE and secondary channel enable SCE. These three signals are passed to the sync/signalling generator SSG. The signal PCE is also passed to the T0 or "test input" port of the microcomputer M.

The microcomputer successively generates start, signalling and stop bits and passes these to the sync/signalling generator via its output port P17 and the line S0. These bits are successively latched into a flip-flop FF31 for subsequent insertion in the B1 bit position of a shift register SR via an input line SSDI. The synchronization code 0011011, and its inverse 1100100 are inserted in the SSE shift register SSR from the two outputs of a second flip-flop FF32. This second flip-flop is clocked once per frame by the secondary channel enable signal SCE. This flip-flop is configured to divide the SCE pulses by two so that it toggles its state upon receipt of each other SCE pulse.

The shift register SSR also receives the secondary channel enable signal SCE. When this enable signal is present, the shift register may be loaded, and it will hold its contents without shifting. Upon termination of the SCE signal the shift register will shift its contents out at the 192 KHz clock rate via a tri-state buffer TB. This buffer is enabled by the sync/signalling enable signal SSE to pass the contents of the shift register SR to the "serial data out" line of the internal data bus. The tri-state buffer isolates the shift register from the "serial data out" line during the periods that the second data word and third data word of a frame are transmitted.

FIG. 11 shows the timing of the signals appearing on the lines in FIG. 10 for the period of 1 superframe (4 milliseconds). As is shown, the microcomputer M receives a start bit at its inputs P27 and $\overline{\text{INT}}$ coincident with the leading edge of the primary channel enable signal PCE. Similarly, a start bit appears at the output of the flip-flop FF31 on line SSDI upon appearance of the leading edge of the next subsequent pulse of the signal PCE. Thus, all the start, signalling and stop bits are received one 125 microsecond frame earlier by the microcomputer M than the bits passed to the shift register via the first flip-flop FF31, due to the single frame delay introduced by this flip-flop. The use of the flip-flop FF31 to store one bit for one frame period is necessary because the microcomputer is timed by the receipt of a bit and only thereafter does it send a bit out from its output port P17.

The microcomputer M initially establishes synchronism with the superframe by monitoring the bits appearing at its input P27 for 23 stop bits and a subsequent start bit. Once synchronism is established, the microcomputer disables its interrupt $\overline{\text{INT}}$ after receiving 8 successive signalling bits until shortly before it expects to receive the next start bit. In this way, the microcomputer will not be interrupted by a stop bit which is erroneously a "0" when it should be "1", so that it will continue to attend to its other functions as the stop bits are received. The microcomputer operates asynchronously from its own high frequency clock. Microcomputer software or firmware is used to determine the expected times of arrival of the pulses on line SI.

Since there is no handshake or echo operation in the communication between the telephone apparatus according to the invention and the telephone system to which it is connected, there is a need for redundancy in the signalling information transmitted to avoid problems upon receipt of an incorrect signalling bit. An incorrect signalling bit can cause the telephone apparatus to function improperly not only during calls but also between calls, since the apparatus is continually "on" as long as it is connected.

Assuming a typical bit error rate of $1 \times 10^{-7}$ (1 incorrect bit out of every 10 million) a bit error would occur every:

$$\frac{10^7 \text{ bits}}{1 \text{ error}} \times \frac{1 \text{ Sec}}{192 \times 10^3 \text{ bits}} = 52.083 \text{ secs/error}$$

Assuming an equal probability of any of the three words comprising the 24 bit frame of being the word with the bit error, a bit error in the sync/signalling word (first word) would occur every:

$$\frac{52.083 \text{ secs}}{\text{bit error}} \times \frac{3 \text{ bytes}}{\text{frame}} = 156.25 \text{ secs/error}$$

According to the invention, this bit error rate has been increased to an order of magnitude of years per error by sending each signalling word (byte) to the microcomputer 3 successive times. The microcomputer compares the three bytes, bit by bit, and responds to the signalling command only if at least two of the three bytes are equal. Thus, the microcomputer responds to the majority vote of the signalling bytes.

Figures 12, 12A:
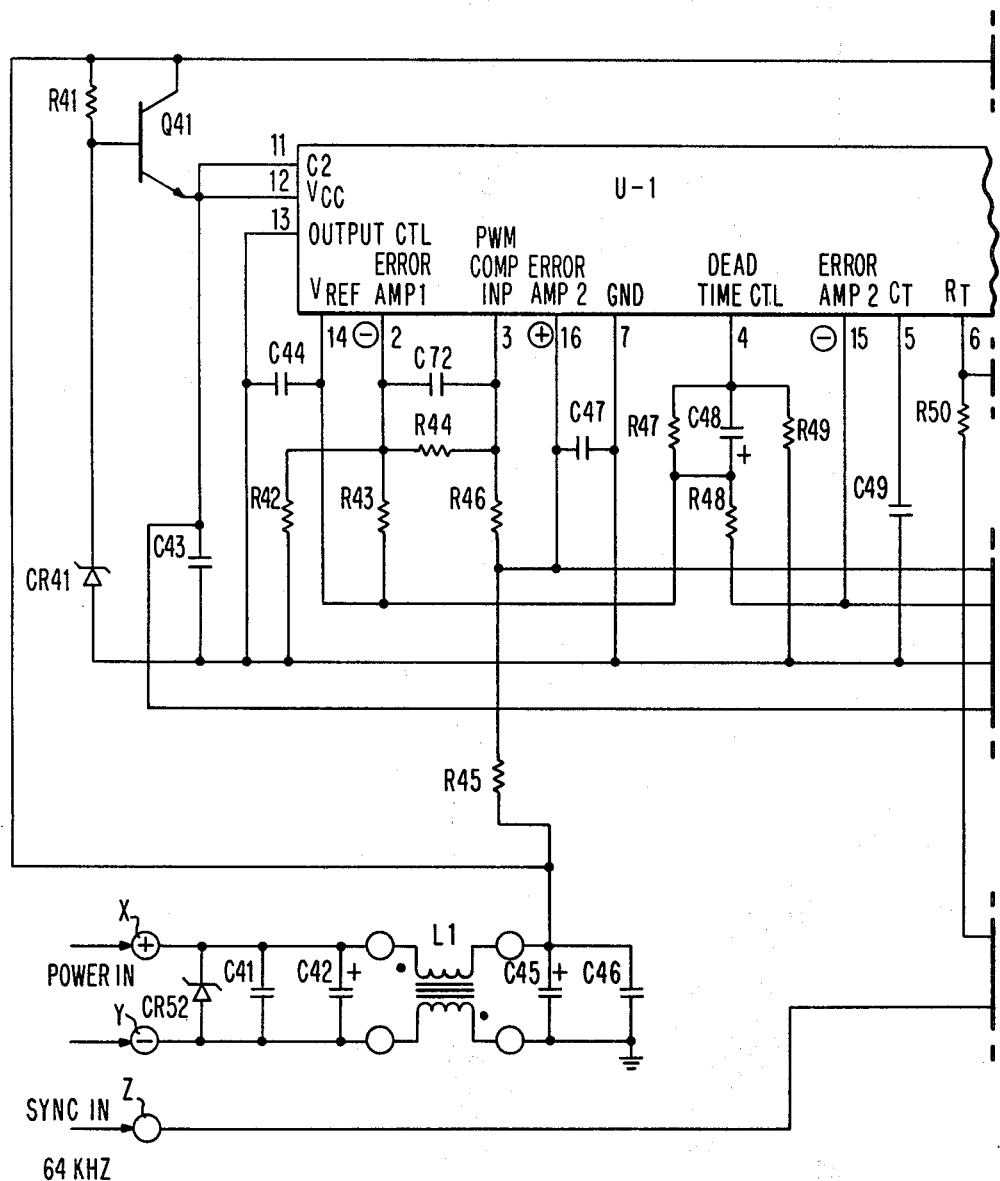
FIGS. 12, 12A and 12B show a schematic diagram of the DC/DC converter shown in FIG. 1.
Figure 12B:
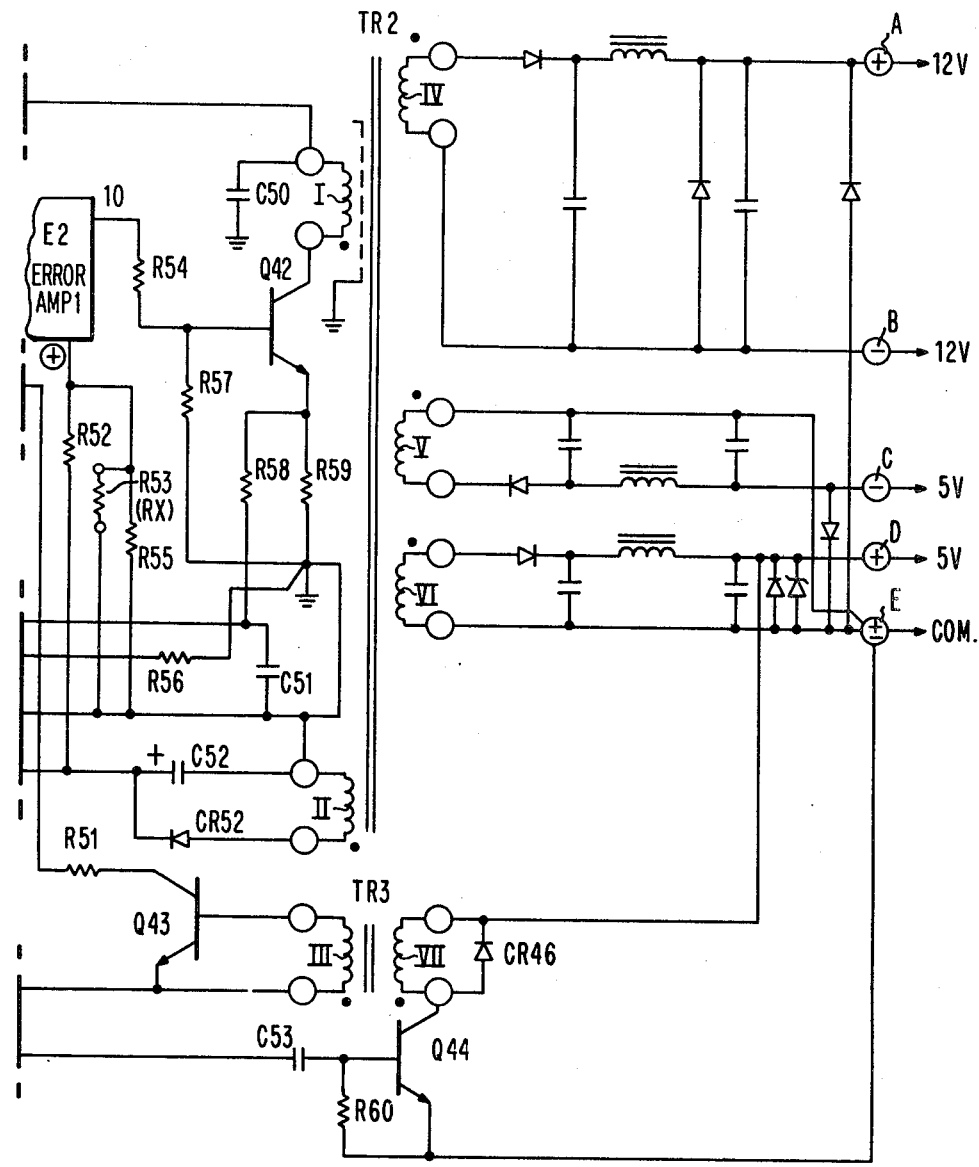

DC/DC Converter (FIG. 12)

As described previously, the DC/DC converter DCC obtains a DC voltage from the primary windings I and II of the transformer TR1. This voltage is phantomed over the transmission lines TL and RL from the originating telephone system. Typically, the received voltage will be approximately 40 volts; however, it is expected to vary over a range of 20–60 volts.

The DC voltage is applied to the DC/DC converter at the input terminals X and Y. The DC to DC converter is isolated from the power supply by a balanced filter comprising the inductance L1 and capacitors C41, C42, C45 and C46. This filter assures a relatively steady voltage at the converter and prevents voltage ripple at the converter from being reflected back to the source. Surges in the input voltage are clipped by a zener diode CR52.

Essentially, the DC/DC converter comprises a monolythic integrated circuit U1 which serves as a source of pulses of constant frequency and variable pulse width. These pulses are applied to the base of a power transistor Q42. The transistor Q42 switches the input voltage applied at the input terminals X and Y across a primary winding I of a transformer TR2, causing interrupted current to flow through this winding. During the period that a pulse is applied to the base of the transistor Q42, the current will increase in the winding I, increasing the magnetic energy stored in the iron of the transformer. When the pulse disappears and the transistor Q42 is switched off, this stored energy is transformed into electrical voltages in the secondary windings II, IV, V and VI. These voltages are rectified and filtered by the diodes and capacitors shown, and are applied to the output terminals A, B, D, D and E. The magnitudes of the output voltages depend, of course, upon the respective number of turns in the secondary windings.

The integrated circuit U1 is preferably a TL494 circuit of Texas Instruments, Inc., in Dallas, Tex. A second source for this circuit is Motorola Semiconductor Products, Inc., in Phoenix, Ariz. The TL494 is a fixed-frequency, pulse width modulation control circuit. Modulation of the output pulses is accomplished by comparison of a sawtooth waveform created by an internal oscillator on an external timing capacitor $C_T$, to either of two control signals. The output stage is enabled during that portion of time when the sawtooth voltage is greater than the control signals. As the control signals increase, the period of time the sawtooth input is greater, then decreases. Thus, the output pulse width decreases.

The two control signals in the integrated circuit are derived from several sources: a dead time control and two error amplifiers. The dead time control input is compared directly by a dead time control comparator which has a fixed 100 mV offset. With the dead time control input biased to ground, the output is inhibited during the portion of time that the sawtooth waveform is below 100 mV. This provides a pre-set dead time of approximately 3% which is the minimum dead time that can be programmed. The pulse width modulation comparator in the integrated circuit compares the control signal created by the two error amplifiers. The error amplifiers are used to monitor signals such as the output voltage and current of the DC/DC converter and provide gain such that millivolts of error at their inputs will result in control signals of sufficient amplitude to provide 100% modulation control.

The TL494 also has an internal 5 volt stable reference which is fed to an output pin $V_{ref}$. The pin numbering and the associated pin labels are indicated in FIG. 12. Pins 10 and 11 are the emitter and collector, respectively, of the output transistor used in the DC/DC converter according to the invention.

Whereas the general configuration of the DC/DC converter thus far described is known in the art, the circuit shown in FIG. 12 includes several novel features which support the operation of the converter. These relate the voltage regulation, overload protection, compensation for variations in input voltage, a startup circuit, a soft start circuit and an external clock synchronization circuit.

Voltage regulation is accomplished in the DC/DC converter by providing a reference voltage to one error amplifier input and a load-dependent voltage to the other. In particular, a reference voltage is supplied to the negative input of the error amplifier 1 (pin 2) in U1 and the load-dependent voltage is applied to the positive input of this error amplifier 1 (pin 1). The reference voltage applied to pin 2 is obtained by dividing the $V_{ref}$ generated in U1 with a voltage divider comprising resistors R42 and R43. The resistor values are chosen such that approximately 2 volts are applied to pin 2 from the 5 volt $V_{ref}$. The load-dependent voltage applied to pin 1 is derived from a separate, secondary winding II on the transformer TR2. Any voltage drop at the output, due to increased load, produces a corresponding reduction in the voltage drop across the winding II. The output of this winding is rectified by the diode CR42 and filtered by capacitors C43 and C52. As indicated in FIG. 12, one side of the winding II is grounded.

The filtered voltage is applied to pin 1 of the integrated circuit U1 via a voltage divider comprising resistors R52, R53 and R55. A resistor R53 is arranged in parallel with the resistor R55 and is labeled "$R_x$". This resistor is used to calibrate the DC/DC converter at the factory. Its precise value is determined by monitoring the +5 volt output of the converter under normal load conditions (using a voltmeter, for example) and adjusting the resistance value of $R_x$ until this output is an accurate 5 volts.

With the connections described above, the integrated circuit U1 varies the duty cycle of the pulses applied to the transistor Q42 in such a way that the output voltages of the DC/DC converter remain constant. An increase in load results in a reduction in the voltage applied to pin 1 with respect to that applied to pin 2 of the integrated circuit U1, thus extending the duty cycle of the pulses produced at pin 10 so that more energy is supplied to the transformer TR2 to compensate for the increased load.

If the duty cycle of the pulses applied to the transistor Q42 is increased beyond approximately 65% however there is a danger that the transistor will "latch up"—that is, remain turned on—because the transistor requires a finite time to turn itself off. This turn-off time, which is called the "storage time" of the transistor, depends upon its base-emitter capacitance. The charge stored within the transistor in this "capacitor" must first dissipate to switch the transistor off.

Consequently, dead time control is required in the present circuit to prevent this occurrence. This dead time control is affected by utilizing the pin 4 in the integrated circuit U1.

As in the case of the voltage regulation, a reference voltage is applied to the negative input of the error amplifier 2 (pin 15) and a pulse width dependent signal is applied to the positive terminal of the error amplifier 2 (pin 16). The reference voltage is obtained by dividing the voltage $V_{ref}$ with a voltage divider comprising resistors R48 and R56. The pulse width dependent signal is derived by filtering the voltage appearing across the emitter resistor R59. This filter comprises the resistor R58 and the capacitors C47 and C51. If this filtered voltage applied to pin 16 of the integrated circuit U1 exceeds the reference voltage on pin 15, then the PWM comparator within the integrated circuit changes state and the output pulse width goes to zero. During the subsequent cycle, of course, the voltage applied to pin 16 will be less than the reference voltage applied to pin 15 so that the maximum pulse will again be produced. As a result, the DC/DC converter will deliver its maximum rated power output in watts, but no more. Additional load placed across the output terminals will result in lowering the voltage produced at the output.

Variations in the voltage received by the DC/DC converter at power input terminals X and Y are compensated by passing this line voltage to pin 16 via a resistor R45. Consequently, the voltage on pin 16 will increase or decrease as the line voltage increases or decreases, respectively, thus varying the tripping point of the overload protection up or down with line voltage.

A start-up circuit is required in the DC/DC converter because the integrated circuit U1 cannot tolerate a supply voltage $V_{cc}$ of more than 42 volts. As noted above, the input power approximately 40 volts, but it is subject to wide swings in voltage. Consequently, the DC/DC converter is designed to generate its own supply voltage for the integrated circuit U1. However, the integrated circuit requires power during an initial start-up period until the converter generates this voltage.

The start-up circuit comprises a resistor R41, a transistor Q41 and a zener diode CR51. Once the converter is operating, the integrated circuit is supplied voltage from the secondary winding II and the rectifier and filter comprising the diode CR42 and the capacitors C43 and C52.

When the power is initially applied to the input terminals X and Y, current flows through the resistor R31 and the zener CR41. The zener diode maintains the base of the transistor Q41 at its breakdown voltage which is 7.5 volts. The transistor Q41 thus conducts and applies voltage to the inputs $V_{cc}$ (pin 12) and C2 (pin 11) of the integrated circuit U1. This input voltage will be maintained at approximately 6.9 volts.

Thereafter, when the DC/DC converter begins to operate, approximately 8 volts is fed back from the circuit comprising the winding II and its rectifier and filter. This 8 volts reverse biases the transistor Q41, turning it off, and supplies the necessary power to the integrated circuit U1. Since the transistor Q41 is merely operated for a brief period during start-up and need not sustain continued use, it may be a relatively low power, inexpensive device.

When the DC/DC converter is initially started up, it will attempt to power equipment which looks like a short circuit. Until the capacitors in the equipment are charged, the load will be large. While the overload protection in the DC/DC converter will activate under this condition, the DC/DC converter according to the invention is provided with an additional circuit, called a "soft start" circuit, so that the duty cycle of the pulses produced by the integrated circuit U1 will initially be small and will then progressively increase to the full value required by the load.

This soft start circuit comprises resistors R47 and R49 and the capacitor C48. During normal operation, the dead time control (pin 4) of the integrated circuit receives a voltage which is divided from the reference voltage $V_{ref}$ by the voltage divider comprising resistors R47 and R49. This dead time control increases the preset "dead time" (100% minus percent duty cycle) from a minimum of 3% to approximately 65%. However, at the time of start up, the capacitor C48 is discharged, shorting the resistor R47, so that pin 4 will see the full voltage produced at the $V_{ref}$ output on pin 14. Consequently, the dead time will be initially larger (approximately 100%) and then will be reduced to the rated dead time (65%) as the capacitor C48 is charged.

Finally, the DC/DC converter is synchronized with an external 64 KHz clock signal applied to the input Z in order to synchronize the output ripple with the operating frequency of the equipment powered by the converter. There are two problems with this external clock synchronization: (1) the integrated circuit U1 does not have an input for operation by an external clock; and (2) in order to generate an external clock signal it is necessary to provide DC power.

Consequently, the DC/DC converter operates solely with the internal clock of the integrated circuit U1 for an initial start-up period and thereafter operates in a mode which is synchronized with the external clock.

The clock synchronization circuit comprises a transformer TR3 having windings III and VII, transistors Q43 and Q44 as well as resistors R51 and R60, capacitor C53 and diode CR64. The clock signal, when it is eventually generated after the equipment driven by the DC/DC converter is powered up, is applied to the base of the transistor Q44. This transistor conducts only when power is applied from the positive 5 volt terminal D and the ground terminal E. Consequently, after start-up, positive and negative pulses are alternately applied to the base of the transistor Q43, thus alternately switching this transistor on and off in synchronism with the external clock. When the transistor Q43 is switched on, the resistor R51 is connected in parallel with the resistor R50.

The frequency and period of the internal clock of the integrated circuit U1 is controlled by the capacitance and resistance connected between ground and the terminal $C_T$ (pin 5) and $R_T$ (pin 6). The pulse period is therefore $R_T C_T$ so that the period may be varied by changing either $R_T$ or $C_T$.

According to the present invention, the time constant $R_T C_T$ is selected (by selecting the values of R50 and C49) so that the natural period of the internal oscillator of the integrated circuit UL is longer than the period of the external clock. Upon receipt of each external clock pulse, the value of $R_T$ is lowered (by connecting the resistor R51 in parallel) so as to shorten the time constant $R_T C_T$. Consequently, on every cycle the internal oscillator sees an initial, relatively large $R_T C_T$ and subsequently, a relatively short $R_T C_T$ with the result that its period corresponds to that of the external clock.

General

As described above the digital telephone apparatus according to the invention is connected for duplex communication with the telephone speech transmission line TL/RL. This apparatus includes the digital transmitter/receiver or transceiver DTR, which is connected with the transmission line TL/RL for transmitting and receiving digital speech data, signalling data and other information via the transmission line TL/RL and also via the internal data bus IB. The serial frame synchronizer SFS detects the synchronization bits and controls the exact timing of the time slots of the data channels in each frame format as well for incoming as for outgoing speech and data transmission.

This configuration of the digital telephone apparatus permits the simple adaption and connection to the normal four wires used in telephone lines. Thus, in a very simple and effective manner it becomes possible to receive and transmit synchronized PCM data, which includes speech data as well as other data and signals.

Because either the primary codec/PCM filter PCF or at least one secondary codec/PCM filter SCF is connected with the internal data bus IB and, via switching means of the voice grade analog circuit VAC, with the microphones, the receiver and the loudspeaker of the subscriber/attendant set, thus utilizing only one channel for PCM voice transmission, at least one more channel is available for the simultaneous transmission of a further data word in the PCM frame format. It is therefore possible to receive and to transmit, completely independently of each other, two different kinds of data. Consequently, the internal data bus IB may be connected with additional peripheral equipment for additional features.

If the internal data bus IB is connected with a peripheral data system, the subscriber who is using the telephone apparatus according to the invention may simultaneously transmit and receive the speech data as well as all types of other data, for example from an external computer.

The transceiver DTR generates pulses in a needed timing scheme with the required broadness, and the serial frame synchronizer places the data bytes in the correct time slots of the frame format. This format contains at least a first plurality of synchronization bits with at least one added signal information bit as a first word and at least a second plurality of spech information bits and/or data information bits as a second word. Each word has one byte of information. In this way the transmission of synchronizing bits, signalling bits, speech and other data bits is PCM compatible and is organized in a simple easily-processed manner.

In small systems, without connected peripheral equipment, a frame may be formed in a very simple, inexpensive manner by two bytes. In larger systems the second byte in a frame represents a speech word whereas the third byte may represent another speech word or a data word. In this way, the telephone apparatus may serve as a telecommunications device for certain peripheral equipment such as a data system connected to the apparatus via a digital interface DDI. Accordingly, the frame format makes it possible to transmit simultaneously different data on separate channels of the same frame.

Line and function keys KL, dial keys KD, an alphanumeric display AD and a subscriber message detailed recording printer SMDR are all connectable, directly or indirectly via logic means KLO, with the microcomputer M of the telephone apparatus according to the invention to provide convenient human-interactive input and output. These I/O devices are operated at a much slower speed than the data system mentioned just above.

Furthermore, in the digital telephone apparatus the voice grade analog circuit switching means VAC controlled by the microcomputer M enables an optional transmission of speech data via one of the two codec/PCM filters in one of the corresponding frame words or channels. This arrangement makes it possible not only to transmit data from a data system simultaneously with PCM voice, but also, for example, to establish a call back connection with a remote subscriber or establish an "intercom" connection with a second subscriber independently of the original call. To this end, optional calling and called subscriber signals evaluated by the microcomputer M produce switching commands which control the voice grade analog circuit switching means VAC to interconnect different optional peripheral units with the telephone apparatus. Therefore, the optional use of one and/or both codec/PCM filters, PCF or SCF, makes it possible to use more than one transmission channel in a simple way both separately as well as simultaneously.

The number of frame words fixes the possible number peripheral units which may be simultaneously connected with the digital telephone transmission line. In other words, the number of 8-bit words in a frame determines the number of features which may be added to the telephone apparatus. If three or more words are provided, for example, thereby providing two or more transmission channels, it is possible to simultaneously and independently connect two or more voice grade analog circuits VAC, at least one data system DDI as well as video terminals and/or printers, etc. with the four wire transmission line TL/RL.

There has thus been shown and described a novel digital telephone apparatus which fulfills all the objects and advantages sought therefore. Many changes, modifications, variations and other uses and applications of the subject invention will, however, become apparent to those skilled in the art after considering this specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed:

1. A transceiver for use with a digital telephone apparatus suitable for subscriber stations and attendant consoles and adapted to be connected for duplex communication to a telephone speech transmission line by means of transmitter and receiver coils of a transformer, said transceiver being controlled by an internally recovered clock pulse train and comprising, in combination:
   (a) a receiving unit connected to the receiving coil of said transformer for receiving a serial ternary level signal stream composed of alternate mark inverted encoded pulses and including:
      (a1) compensation filter for compensating distortions of transmitted signals and for filtering out-of-band interferences;
      (a2) a full wave rectifier circuit connected to said compensation filter for generating unipolar output signals representing binary values "1" by positive high level pulses;
      (a3) a pulse detection circuit connected to said rectifier circuit for deriving rectangular pulses from said unipolar output signals, said rectangular pulses being in phase with said unipolar output signals and having a pulse width of substantially one half the pulse width of said unipolar output signals;
      (a4) a phase-locked loop circuit coupled to said pulse detection circuit for reconstructing a clock pulse train from said rectangular pulses generated by said pulse detection circuit, said phase-locked loop circuit having an output supplying said reconstructed clock pulses;
      (a5) a D flip-flop having a data input connected to a pulse shaping circuit, a clock input connected to said output of said phase-locked loop circuit and having an output for a data output for a synchronized data stream composed of pulses representing a high level signal for binary values "1" and a low level signal for binary values "0"; and
   (b) a transmitting unit having a data input for receiving from said telephone apparatus an outgoing serial/digital data stream identically encoded as an incoming data stream, having a clock pulse input connected to said output of said phase-locked loop circuit for receiving internal clock pulses and a data output coupled to said transmission line by said transmitter coil of said transformer, said transmitting unit including means for converting the pulses of said outgoing data stream into an output data stream wherein the signals are encoded according to alternate mark inverted encoding.

2. The transceiver as recited in claim 1, wherein said compensation filter comprises:
   (a11) a first and a second input each connected to an end of said receiving coil of said transformer and an output connected to said output of said compensation filter;
   (a12) a first operational amplifier having an inverting and a non-inverting input and an output connected to said output of said compensation filter;
   (a13) an impedance matching resistor connected between both of said inputs of said compensation filter;
   (a14) an input RC network connected between said inverting and non-inverting inputs of said first operational amplifier and said first and second inputs of said compensation filter;
   (a15) a multiple feedback circuit providing negative feedback between said first operational amplifier output and said inverting input of said first operational amplifier.

3. The transceiver as recited in claim 1, wherein said full wave rectifier circuit comprises:
   (a21) an input connected to said compensation filter and an output;
   (a22) a second operational amplifier having an inverting input connected to said full wave rectifier circuit; a non-inverting input connected to ground, and an output; a first series load resistor arranged between said input of said rectifier circuit and said inverting input of said second operational amplifier; and a negative feedback network of said second operational amplifier including resistors of substantially the same impedance value as said first series load resistor for obtaining substantially a voltage gain of one of said second operational amplifer;

(a23) a first and a second diode each having an anode and a cathode, being arranged in series at said output of said second operational amplifier and being connected to one of said resistors of said multiple feedback network of said second operational amplifier; and (a24) a third operational amplifier having an inverting input, a non-inverting input connected to ground and an output; a second series load resistor arranged between said anode of said second diode and said inverting input of said third operational amplifier and having an impedance value substantially identical to the value of said first series load resistor; a third series load resistor arranged between said inverting input of said third operational amplifier and said input of said rectifier circuit and having an impedance value of substantially twice the value of said load resistor of said first operational amplifier; and a feedback resistor of substantially four times the value of the impedance of said load resistor of said second operational amplifier, whereby a voltage gain of two for the third operational amplifier is obtained.

4. The transceiver unit as recited in claim 3, wherein said pulse detection circuit comprises:

(a31) a detector composed of a voltage comparator having an inverting input a non-inverting input and an output for said pulse detection circuit; said inverting input of said voltage comparator being connected to said full wave rectifier circuit and said non-inverting input being connected to said output of said second operational amplifier; and (a32) a parallel RC circuit arranged between said non-inverting input of said voltage comparator and ground whereby a direct current threshold voltage of substantially one half the peak value of rectifier output signals is obtained for supplying a variable reference voltage to said non-inverting input of said voltage comparator.

5. The transceiver as recited in claim 4, wherein said detector further comprises:

(a33) a third diode having an anode and a cathode; said anode of said third diode being connected to said output of said second operational amplifier and said cathode of said third diode being connected to said non-inverting input of said detector.

6. The transceiver as recited in claim 1, wherein said phase-locked loop circuit comprises:

(a41) a phase comparator having a signal input, a loop control input and an output, said signal input coupled to said output of said pulse shaping circuit;

(a42) a low-pass filter including a further operational amplifier having an inverting input, a non-inverting input and an output, and including a multiple feedback circuit composed of a further resistor and a further capacitor arranged in series;

(a43) an internal reference voltage source connected between said output and said non-inverting input of said further operational amplifier;

(a45) a voltage controlled oscillator having an input and an output, said input of a threshold circuit connected to said output of said further operational amplifier and said output of said further operational amplifier being a loop control output and being connected to the loop control input of said phase comparator; and (a46) a transistor having a base resistor connected to said loop control output, an emitter connected to ground and a collector forming said output of said phase-locked loop circuit carrying said recovered clock pulses.

7. The transceiver as recited in claim 6, wherein said phase-locked loop circuit further comprises:

(a47) an analog switch having a signal input, a signal output and a switch control input, said signal input of said analog switch being connected to said signal output of said phase comparator, said switch control input being connected to said output of said comparator; and (a48) a further input load resistor of said further operational amplifier arranged between said signal output of said analog switch and said inverting input of said further operational amplifier, whereby said further operational amplifier in conjunction with its multiple feedback network forms a sampling circuit for signals generated at said signal output of said phase comparator.

8. The transceiver as recited in claim 7, wherein said phase-locked loop circuit further comprises:

an adjustable resistor connected between said input of said voltage controlled oscillator and ground for determining the center frequency of said phase-locked loop circuit.

9. The transceiver as recited in claim 8, wherein the phase-locked loop circuit further comprises:

a further resistor arranged between said input of said voltage controlled oscillator and said output of said further operational amplifier for determining a maximum deviation from said center frequency by means of the value of said further resistor.

10. The transceiver unit as recited in claim 1, wherein said transmitting unit comprises:

(b11) a toggle flip-flop having a data input connected to said data input of said transmitting unit, having a clock input connected to said clock pulse input of said transmitting unit and having a data output; and (b12) a pulse shaping filter composed of a further operational amplifier as active element and of an RC input network and a multiple RC feedback network designed such that said pulse shaping filter forms a one-pole band pass characteristic and a one-pole low pass characteristic; said pulse shaping filter being connected between said data output of said toggle flip-flop and said output of said transmitting unit.

11. The transceiver as recited in claim 10, wherein the toggle flip-flop comprises a JK flip-flop having a J-input and a K-input both commonly connected to said data input of said transmitting unit.

* * * * *